United States Patent
Matsuyama et al.

[11] Patent Number: 5,852,984
[45] Date of Patent: Dec. 29, 1998

[54] UNDERWATER VEHICLE AND METHOD OF POSITIONING SAME

[75] Inventors: Aya Matsuyama, Yokohama; Rumi Kuramata, Kamakura; Koji Kobayashi, Yokohama; Yuuichi Miura, Funabashi; Naoya Hirose, Yokohama; Toshihiko Sasahara, Fujisawa; Katsumi Kai, Mitaka, all of Japan

[73] Assignee: Ishikawajimi-Harima Heavy Industries Co., Ltd., Tokyo, Japan

[21] Appl. No.: 772,312

[22] Filed: Dec. 23, 1996

[51] Int. Cl.⁶ .................................................. B63B 59/10
[52] U.S. Cl. ............................................. 114/222; 15/1.7
[58] Field of Search ................................ 114/222; 15/1.7

[56] References Cited

U.S. PATENT DOCUMENTS

| | | |
|---|---|---|
| 3,337,889 | 8/1967 | West . |
| 3,913,452 | 10/1975 | Ward et al. .............................. 114/222 |
| 3,950,809 | 4/1976 | Schatzmann ............................... 15/1.7 |
| 4,010,636 | 3/1977 | Clark et al. ............................. 73/67.85 |
| 4,095,378 | 6/1978 | Urakami .................................. 114/222 |
| 4,154,680 | 5/1979 | Sommer ..................................... 15/1.7 |
| 4,574,722 | 3/1986 | Orita et al. ............................... 114/222 |
| 4,604,960 | 8/1986 | Wachi ..................................... 114/222 |
| 4,697,536 | 10/1987 | Hirata ..................................... 114/222 |
| 4,703,817 | 11/1987 | Stoner et al. ........................... 114/222 |
| 4,821,665 | 4/1989 | Matthias et al. ........................ 114/222 |
| 4,926,957 | 5/1990 | Urakami .................................. 114/222 |
| 5,174,222 | 12/1992 | Rogers .................................... 114/222 |

FOREIGN PATENT DOCUMENTS

| | | |
|---|---|---|
| 0461506 | 12/1991 | European Pat. Off. . |
| 1928897 | 12/1969 | Germany . |
| 299492 | 12/1987 | Japan ..................................... 114/222 |
| 1514118 | 6/1978 | United Kingdom . |
| 2189684 | 11/1987 | United Kingdom . |

OTHER PUBLICATIONS

"Vessel Inspection Made Easy", Nuclear Engineering International, vol. 35, No. 435, Oct., 1990, Sutton, p. 20 XP000201515.

Primary Examiner—Sherman Basinger
Attorney, Agent, or Firm—Tung & Associates

[57] ABSTRACT

A vehicle or robot movable in the water includes a body having a first opening in its abdomen. A float is provided at the front portion of the body so that the vehicle body suspends in the water with its front portion up. A pressure reducing device is provided in the body for reducing an inner pressure of the body so as to cause the body to suctionally adhere on a wall in the water with its abdomen facing the wall. A sealing skirt is attached along the first opening formed in the abdomen so that it contacts the wall to maintain the body's inner pressure negative as the body adheres on the wall. A drive unit is also provided in the body for moving the body on the wall. The pressure reducing device includes a hose communicated with the body at its one end and a pump connected with the other end of the hose for pulling water out of the body.

83 Claims, 27 Drawing Sheets

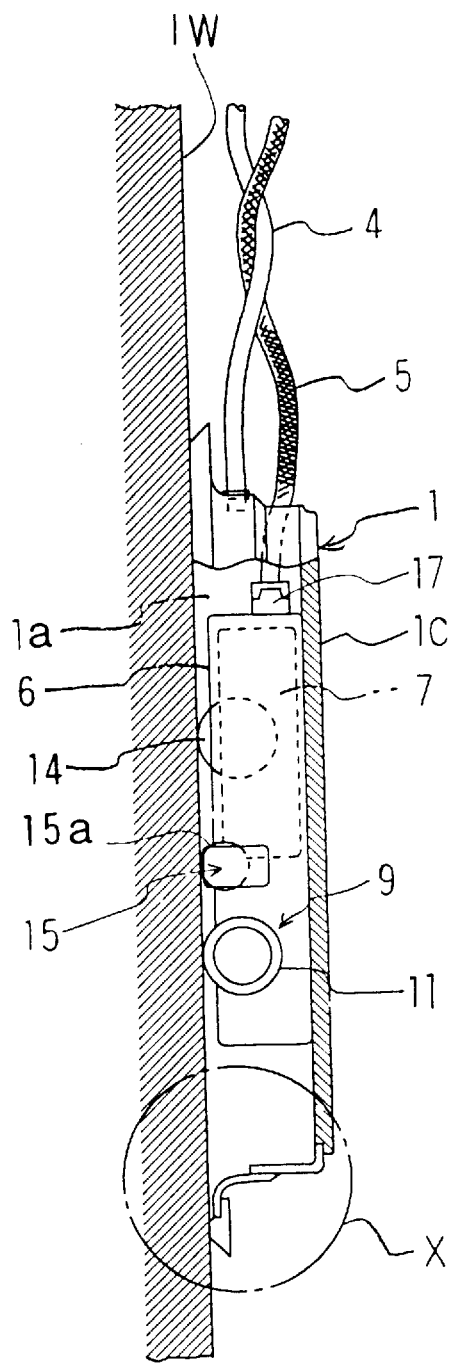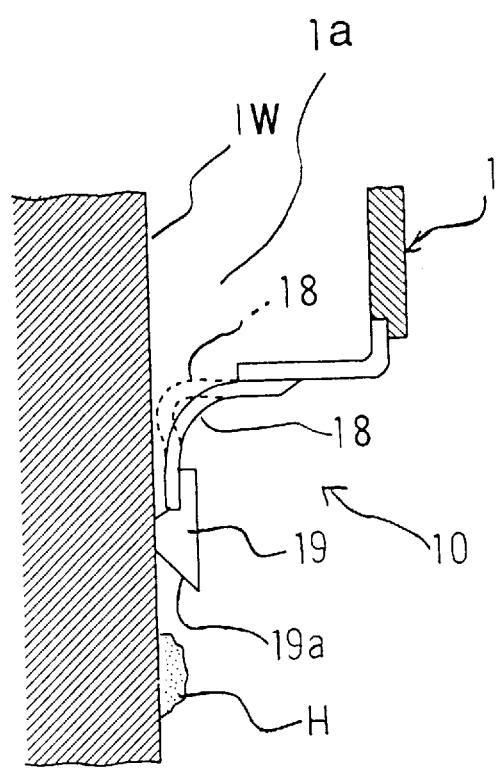
FIG. 3A
FIG. 3B

UNDERWATER VEHICLE AND METHOD OF POSITIONING SAME

BACKGROUND OF THE INVENTION

1. Technical Field

The present invention relates to an underwater vehicle or robot movable in the water suited particularly for inspection of underwater constructions, machines etc. and for works and operations in the water, such as inner surface inspection of a reactor pressure vessel, cleaning of a screw propeller of a ship and the like. The present invention also relates to a positioning method for the underwater vehicle.

2. Background Art

For various reasons, it is sometimes difficult and even dangerous for operators and workers to approach a channel extending from a thermal power electric plant to the sea, a screw propeller of a ship in the water, an underwater construction and the like. However, circumstances often require to clean, inspect and do some works to them. Therefore, generally an underwater vehicle or robot which is remote controllable is used for such purposes.

Various underwater vehicles or robots are known in the art. One of such vehicles is disclosed in Japanese Utility Model Application, Publication No. 3-79323 and its schematic structure is illustrated in FIGS. 27A and 27B of the accompanying drawings.

FIG. 27A depicts a lateral view of a conventional underwater vehicle and FIG. 27B depicts its bottom view.

As shown in FIGS. 27A and 27B, the conventional underwater vehicle 110 is equipped with a plurality of thrust fans 112. These fans 112 are rotated to generate water jets as indicated by unshaded arrows such that the vehicle 110 is pushed downwardly by repulsive or reacting forces. Accordingly, it is possible to maintain the vehicle 110 in contact with a surface 114. The underwater vehicle is also equipped with a plurality of wheels 116 so that it can move on the surface 114 in the water. This underwater vehicle functions properly as long as it moves on a flat horizontal surface.

However, when it should climb a vertical wall in the water, the power of the thrust fans 112 must be raised considerably to insure appropriate contact with the vertical wall since the contact with the vertical wall depends on intensity of the water jets generated by the thrust fans 112. If the appropriate contact with the vertical wall is not maintained, the wheels 116 of the underwater vehicle leave the vertical wall and therefore the vehicle cannot move.

If the thrust fans 112 are designed in larger dimensions to raise its power, motors for driving these fans will also be manufactured in larger scale. This results in increase in volume and weight of the vehicle 110 and also results in higher manufacturing cost.

SUMMARY OF THE INVENTION

One object of the present invention is to provide an underwater vehicle which is compact and lightweight and which can move on a vertical wall in the water.

According to one aspect of the present invention, there is provided an underwater vehicle which comprises: a container-like body having a float in its front portion to suspend in the water with its front portion being up; an opening in its abdomen; suction means for reducing a pressure inside the vehicle body so as to suck the abdomen of the vehicle body onto a wall in the water; a skirt provided along the periphery of the opening formed in the body's abdomen for contacting the wall and maintaining the body's interior to a negative pressure while the vehicle body is being suctionally attached on the wall; and drive means provided in the vehicle body for moving the vehicle body along the wall.

The abdomen of the vehicle is faced to the wall in the water and then the suction means is actuated to discharge the water from the vehicle so as to reduce the inside pressure of the vehicle. As the inside pressure becomes negative, a force acts on the vehicle from outside due to pressure difference so that the vehicle is pushed to the wall or the vehicle is sucked on the wall. The skirt extending along the opening formed in the abdomen of the vehicle firmly adheres onto the wall as the vehicle inner pressure is reduced. Accordingly, the sealing between the vehicle and the wall is achieved and maintained. Consequently, a relatively small force is needed to maintain the vehicle onto the vertical wall or to maintain proper contact between vehicle wheels and the vertical wall. With the contact between the vehicle wheels and the wall being maintained, the drive means is actuated to move the vehicle on the wall.

The float of the underwater vehicle counterbalances the weight of the vehicle in the water. Therefore, the proper contact between the vehicle and the wall is easily maintained. Further, it is possible to translate the vehicle on a vertical wall with a relatively small power.

A cleaning unit may be attached to the vehicle.

An ultrasonic probe may also be attached to the vehicle.

BRIEF DESCRIPTION OF THE ACCOMPANYING DRAWINGS

FIG. 3A illustrates a lateral sectional view of the underwater vehicle shown in FIG. 1 when the vehicle suctionally attaches itself to a vertical wall in the water;

FIG. 3B is an enlarged sectional view of part X (i.e., skirt member of the underwater vehicle) in FIG. 3A with an obstacle existing near the skirt member on the wall;

DETAILED DESCRIPTION OF THE PREFERRED EMBODIMENTS

Figure 1:
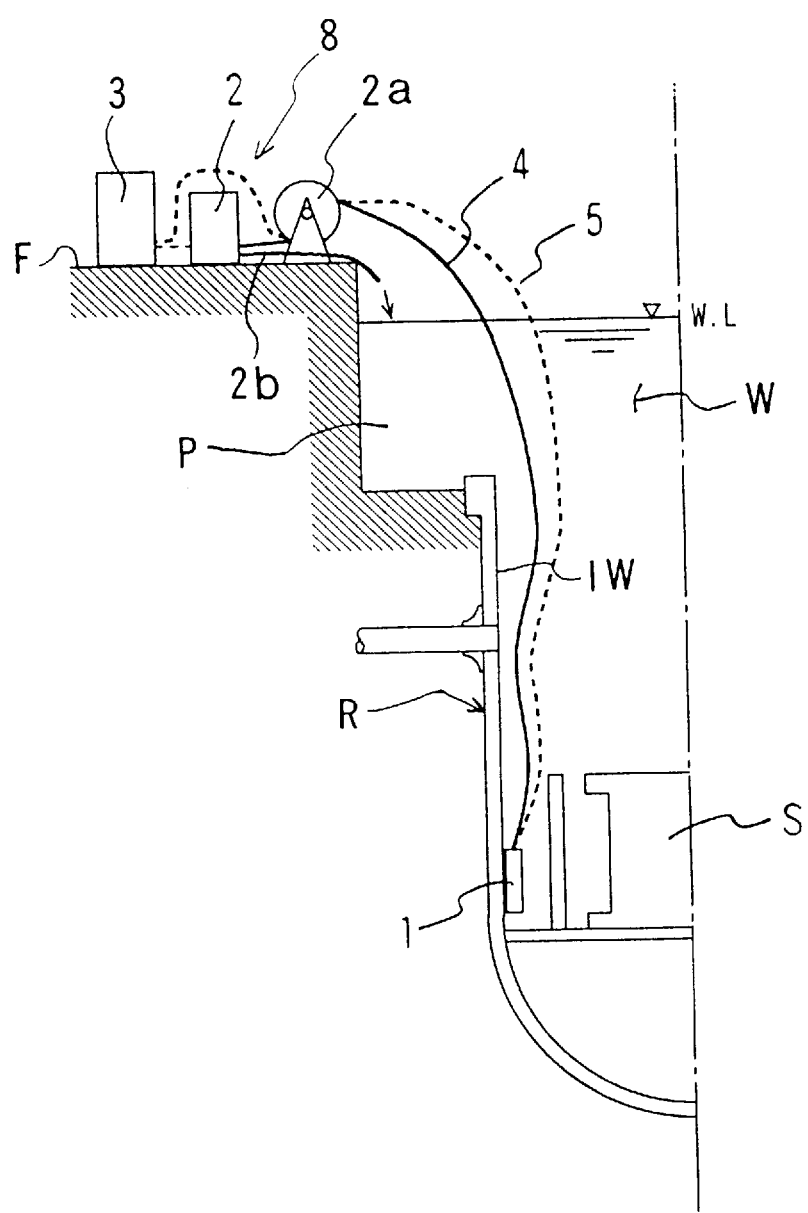
FIG. 1 is a general view illustrating how an underwater vehicle or robot according to one embodiment of the present invention is used in a reactor pressure vessel.

Now, preferred embodiments of the present invention will be described with reference to FIGS. 1 to 26 of the accompanying drawings. It should be noted that the same reference numerals are used in different drawings to designate same or similar components.

First Embodiment:

Referring to FIG. 1, illustrated is one embodiment of an underwater vehicle according to the present invention. In this illustration, R designates a reactor pressure vessel, P a fuel pool, W the water received in the reactor pressure vessel R (the fuel pool is also filled with the water), WL a water level, S a structure built in the reactor pressure vessel R, IW an inner wall of the reactor pressure vessel R, and F a floor above the water level WL.

The underwater vehicle 1 (occasionally referred to as "robot" hereinafter) is movable on the inner wall IW of the reactor pressure vessel R. A pressure reducing pump 2 is mounted on the above-water floor F of the fuel pool P and a controller 3 is provided for remote controlling the vehicle 1. A flexible pressure-resistive hose 4 connects the vehicle 1 in the reactor pressure vessel R with the pressure reduction pump 2 on the floor F, an operation cable 5 connects the vehicle 1 in the reactor pressure vessel R with the controller 3, and a cable drum 2a is provided for winding and unwinding the pressure resistance hose 4 and operation cable 5 respectively.

Figure 2:
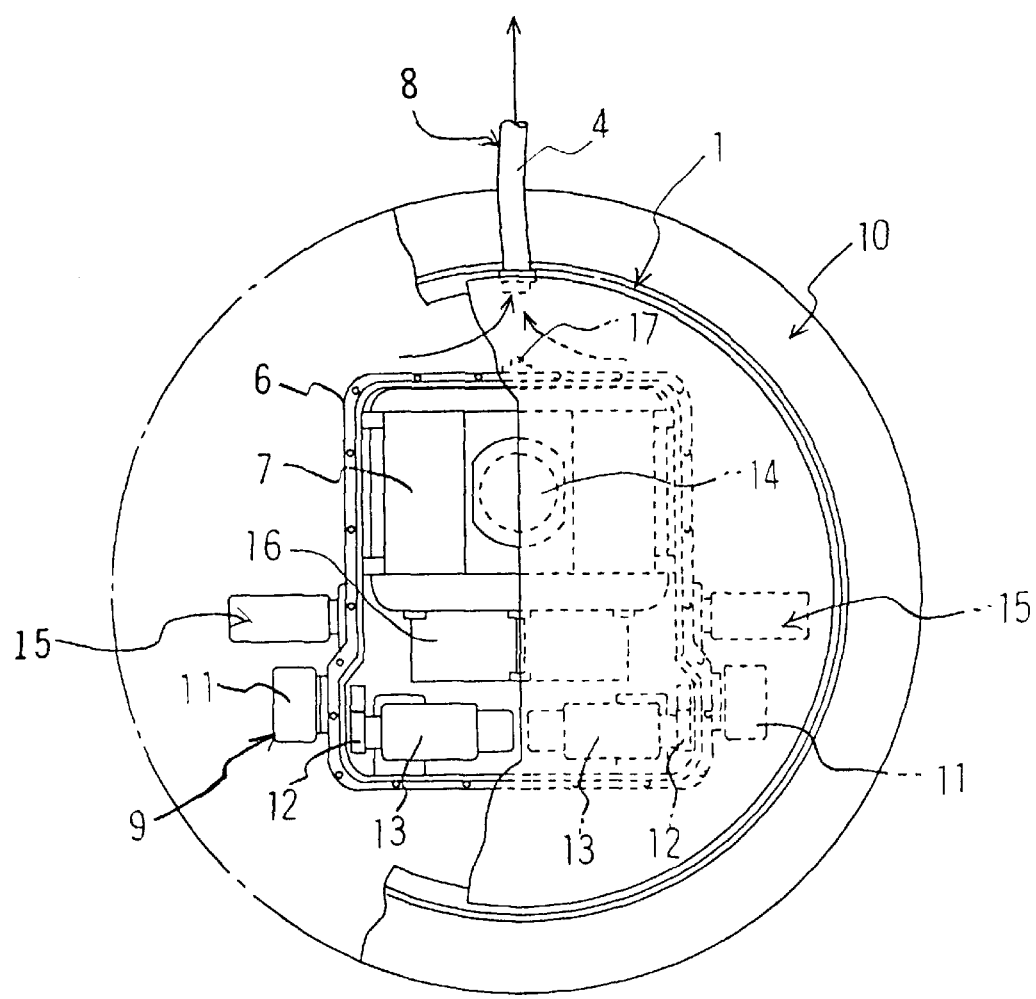
FIG. 2 illustrates a plan view of the underwater vehicle shown in FIG. 1 with an approximate left half of a Petri dish-like cover being omitted to show the interior.

Referring to FIGS. 2 and 3A, the vehicle 1 has a Petri dish-like shape body. It is opened on one side (i.e., abdomen side). Inside the vehicle 1, provided are a rectangular watertight casing 6, a float 7 for suspending the vehicle 1 in the water W, a suction unit 8 for causing the vehicle 1 to adhere onto the inner wall IW of the reactor pressure vessel, a drive unit 9 for moving the vehicle 1 on the inner wall IW and a sealing skirt 10 for maintaining an inner pressure of the vehicle 1 to a negative pressure. Numeral 1c designates a back of the underwater vehicle 1.

The float 7 is a watertight tank filled with the air or foaming polystyrene (styrofoam). The float 7 is mounted at a position apart from the center of the casing 6 so that the vehicle 1 is suspended in a fixed posture in the water W. The float 7 also serves to counterbalance the weight of the vehicle 1 and associated components such as the drive unit 9, inspection units and cleaning units (will be described later) by its floating force. In this particular embodiment, the floating force exerted by the float 7 is determined such that the vehicle 1 slowly descends in the water W.

The suction unit 8 includes the pressure reducing pump 2 and pressure-resistive hose 4. Upon actuation of the pressure reducing pump 2, the suction unit 8 pulls the water from the interior of the vehicle 1 using the hose 4 extending from one end of the vehicle 1 to the suction unit 8. As a result, the interior of the vehicle 1 becomes negative pressure if the abdomen 1a of the vehicle 1 is contacting the inner wall IW. The negative pressure forces the vehicle 1 on the wall IW.

As best seen in FIG. 2, the translation unit 9 includes a pair of wheels 11 and 11 rotatably mounted on both sides of the casing 6, an associated pair of drive motors 13 housed in the casing 6 for rotating the wheels 11 and a driven ball caster 14 freely rotatably mounted in a center of the float 7 and in a forward position with respect to the wheels 11. The positions of the caster 14 and wheels 11 and 11 define an equilateral triangle in a top view with the caster 14 being the peak of the equilateral triangle. The drive motors 13 are driven independently. In other words, the drive wheels 11 can rotate at different speeds and in opposite directions so that the vehicle 1 is able to advance in a desired direction at a desired speed on the wall IW. Each drive motor 13 has a pinion 12 between itself and the associated wheel 11. As illustrated in FIG. 3A, the ball caster 14 and wheels 11 contact the inner wall IW and the casing 6 and float 7 are spaced from the inner wall IW when the underwater vehicle adheres and moves on the inner wall IW.

As shown in FIG. 2, a pair of planimeters 15 is provided on both sides of the casing 6 in front of the wheels 11, and a gravity sensor (not shown) is also provided near the drive unit 9 for detecting inclination of the vehicle 1. Therefore, it is possible to know a trace of movement of the vehicle 1 on the wall IW. As depicted in FIG. 3A, the planimeters 15 contact the wall IW. Each planimeter 15 includes a friction roller 15a which contacts and rotates on the wall IW and a rotary encoder (not shown) for counting the number of rotations of the friction roller 15a. As shown in FIG. 2, the drive unit 9, planimeters 15 and 15, etc. are controlled by a control board 16 provided in the casing 6, and the control board 16 is in turn controlled by the main controller 3 disposed on the above-water floor F (FIG. 1). As understood from FIGS. 1 and 3A, the cable 5 connects the control board 16 with the main controller 3 via a connector 17 attached to the front portion of the casing 6.

The underwater vehicle of the invention has the skirt member 10 along its outer periphery as shown in FIG. 2. The detail of the skirt member 10 is illustrated in FIG. 3B. The skirt member 10 includes a flare ring member 18 made from an absolutely flexible or resilient material such as rubber and attached to the outer periphery of the opening 1a of the vehicle 1, and a ring member 19 attached to the outer periphery of the flare ring member 18 made from a relatively resilient material such as polyester resin. The ring member 19 can bend at a particular portion thereof. The skirt 10 can prevent the water from flowing into the vehicle 1 to prohibit the suction force which keeps the vehicle 1 on the wall IW from weakening since it seals the clearance between the periphery of the opening 1a of the vehicle 1 and the wall IW of the reactor pressure vessel when the abdomen of the vehicle 1 contacts the inner wall IW of the vessel and the water inside the vehicle 1 is taken away by the hose 4 of the suction unit 8 to reduce the pressure inside the vehicle 1. Upon reducing of the pressure in the vehicle 1 by the pressure reducing unit (or suction unit) 8, the flare ring 18 deforms inward as indicated by the dotted line in FIG. 3B so that the ring 19 is firmly pressed against the wall IW. Accordingly, the clearance between the outer periphery of the opening 1a of the vehicle 1 and the wall IW is effectively sealed. The seal member 19 has an inclined surface 19a along its outer periphery. Therefore, when the vehicle 1 encounters an obstacle 11 on the wall IW such as dusts, bolts, welding lines, shells, steps, etc., it can easily ride over the obstacle 11. It should be noted that the skirt member 10 does not seal the clearance between the outer periphery of the vehicle 1 and the wall IW completely, but it loosely seals the clearance so that a certain amount of water is able to flow into the vehicle 1 and therefore the vehicle 1 can move on the wall IW. If the skirt 10 completely sealed the clearance like a general rubber acetabulum, the inside of the vehicle 1 would become vacuum and the vehicle would be fixed on the wall IW.

Now, operations of the underwater vehicle 1 of the invention will be described.

Referring to FIG. 1, an operator (not shown) places the vehicle 1 into the water W from the fuel pool P side using the hose 4 and/or cable 5 by its hands or using a manipulator, crane or the like (not shown). In this immersing or loading operation, the vehicle 1 takes a suspended posture in the water W in parallel to the wall IW of the reactor pressure vessel R since the float 7 is mounted at a position off the center of the vehicle 1 while it is slowly descending. Then, the vehicle 1 is faced to the wall IW on its abdomen side or opening 1a side. After that, the pressure reducing pump 2 on the floor F is actuated such that the water inside the vehicle 1 is sucked up toward the pump 2 by the pressure-resistive hose 4 from the top of the vehicle 1 as indicated by the solid and dotted arrows in FIG. 2. As a result, the pressure in the vehicle 1 is reduced and pressure difference between the inside and outside of the vehicle 1 forces the vehicle 1 onto the wall IW. Thus, the drive wheels 11 and 11 of the drive unit 9 as well as the ball caster 14 are pushed against the wall IW. The pressure difference between the outside and inside of the vehicle 1 or the force for pushing the vehicle 1 onto the wall IW is easily controllable by changing the inner pressure of the vehicle 1. The inner pressure of the vehicle 1 is adjustable by changing the output of the pressure reducing pump 2. As the drive wheels 11 and the ball caster 14 rotate on the wall IW, a traction (or contact friction) force is generated between the wall IW and the drive wheels and ball caster.

The water pulled out of the vehicle 1 by the hose 4 flows into the pump 2 disposed on the floor F and filtered by a filter unit (not shown). The filtered water is then returned to the reactor pressure vessel R through a discharge pipe 2b of the pressure reducing pump 2 as indicated by the arrow in FIG. 1. The discharge pipe 2b extends from an outlet of the pump 2 toward the fuel pool P.

When the vehicle 1 adheres on the wall IW and is ready to move, an electric power and a control signal are supplied to the controller board 16 or the drive unit 9 via the cable 5 from the main controller 3 on the floor F. The underwater vehicle 1 starts moving on the wall IW upon activation of the drive unit 9. If the underwater vehicle 1 should move up or down from the position and posture as shown in FIGS. 1 and 2, the drive wheels 11 and 11 are rotated at the same speed in the same direction. If it should be moved right or left, the drive wheels 11 are rotated in opposite directions or one of the wheels is driven or the drive wheels 11 are rotated at different speeds to turn the vehicle 1 by 90 degrees in right or left direction, and then the drive wheels 11 are driven at the same speed in the same direction. The distance between the underwater vehicle 1 and the pump 2 and controller 3 varies upon movement of the vehicle 1. However, this does not cause any problems since the hose 4 and cable 5 extending between the vehicle 1 and the pump 2 and controller 3 are flexible and windable/unwindable on/from the drum 2a on the floor F. The hose 4 and cable 5 are wound on or unwound from the drum 2a such that they are not too short or too long with respect to the varying distance of the underwater vehicle 1 from the drum 2a. Specifically, the length of the hose 4 and cable 5 is controlled such that the hose 4 and cable 5 do not exert a pulling back force to the moving (or leaving) vehicle 1 and they are not caught by or hooked on the structure S in the water W due to its excessively surplus and slack length. The planimeters 15 are provided for the drive wheels 11 respectively, as mentioned above. Therefore, if the vehicle 1 is positioned on a predetermined reference position on the wall IW, it is possible to detect an accurate traveling route of the vehicle 1 from the reference position by collecting information and data sent from the planimeters 15 via the control board 16 or directly into the controller 3 and processing these information and data.

As understood from the above description, the underwater vehicle 1 of the present invention employs the suction mechanism and takes advantages of pressure difference between its inside and outside to maintain itself on the vertical wall IW, not the thrust fans, so that it is designed in compact dimensions with a lighter weight. In addition, it is feasible to translate the vehicle 1 on the vertical wall IW with a relatively small force.

Figure 4A:
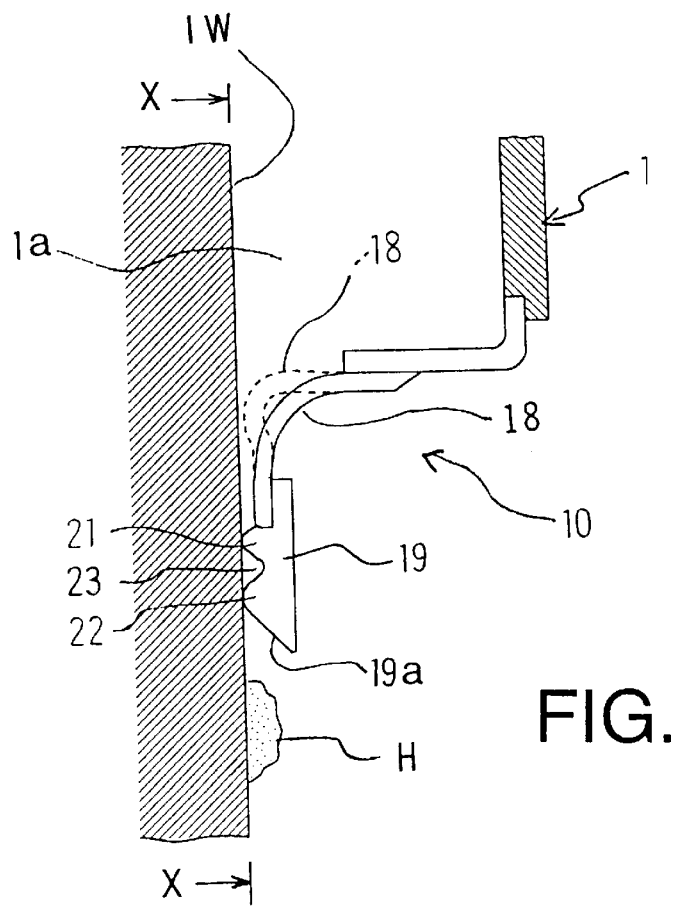
FIG. 4A illustrates a sectional view of a modified skirt according to a second embodiment of the present invention.
Figure 4B:
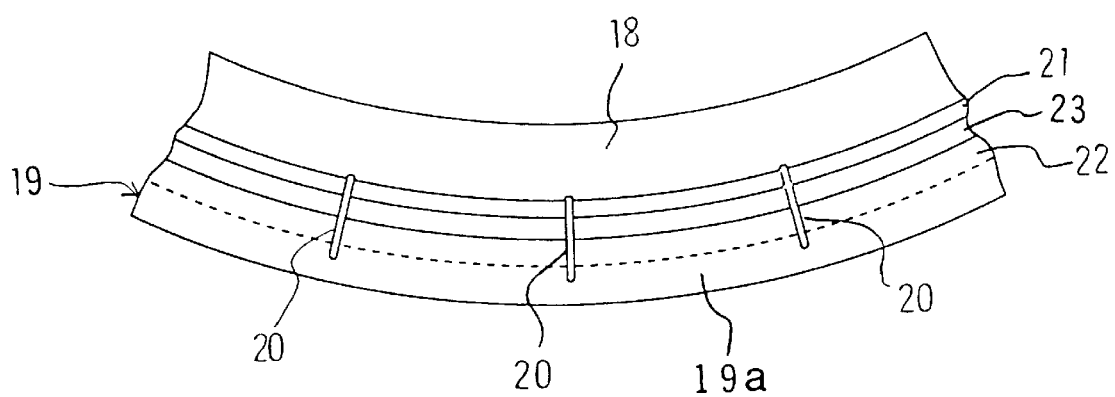
FIG. 4B depicts an enlarged sectional plan view of the skirt shown in FIG. 4A as taken along the line X—X.

Referring to FIGS. 4A and 4B, illustrated is a modification of the skirt member 10. FIG. 4A shows an enlarged sectional view of the modified skirt 10, which is similar to FIG. 3B, and FIG. 4B shows a sectional view of the skirt 10 taken along the line X—X of FIG. 4A. In FIGS. 4A and 4B, numeral 1a designates the opening of the vehicle 1 and 18 designates the flare skirt member. The flare skirt member 18 which is deformed inwardly upon reducing of the inner pressure of the vehicle 1 is indicated by the dotted line.

The skirt 10 has a modified ring member 19. Specifically, the ring member 19 has a plurality of projections 21 and 22 on its one face which contacts the inner wall IW of the reactor pressure vessel. In this particular embodiment, there are provided two projections 21 and 22. The projections 21 and 22 circularly extend along the outer periphery of the ring member 19 in a plan view as understood from FIG. 4B. An annular groove 23 is formed between the coaxial annular projections 21 and 22. A plurality of radial grooves 20 are formed such that they penetrate the inner and outer projections 21 and 22 at predetermined positions along the outer periphery of the ring member 19. The radial grooves 20 communicates the inside of the vehicle 1 with the outside.

The projections 21 and 22 of the ring member 19 facilitate deformation of the ring member 19 in a direction perpendicular to the wall IW so that the ring member 19 can ride over the obstacle H existing on the wall IW in an easier manner than the ring member 19 shown in FIG. 3B.

Further, if the ring member 10 of the previous embodiment shown in FIG. 3B is employed, a large amount of water may flow into the inside of the vehicle 1 when the ring member 19 rides on a tall or large obstacle H since a large clearance may be created between the wall IW and the ring member 19 near the obstacle H and a relatively long period is needed until the ring member 19 lands on the wall IW again after leaving. This temporarily reduces the adhering or sucking force of the vehicle 1. In the modified embodiment shown in FIGS. 4A and 4B, on the other hand, the inner projection 21 still contacts the wall IW when the outer projection starts riding over the obstacle H. When the inner projection 21 climbs the obstacle H, the outer projection 22 soon or already contacts the wall IW. Therefore, a less amount of water or no water is allowed to flow into the vehicle 1 even if the ring member 19 rides over a tall obstacle.

As depicted in FIG. 4A, the outer projection 22 has a relatively large radius of curvature in its cross section and is continuous to the inclined lower surface 19a of the ring member 19. The inner annular projection 21 is spaced from the outer annular projection 22 by a clearance 23 and has a radius of curvature smaller than the outer projection 22 in cross section. Therefore, the ring member 19 can smoothly climb over a large obstacle H. In addition, the plurality of radial grooves 20 crossing the projections 21 and 22 allow some water to flow into and out of the vehicle 1 so that the vehicle 1 does not stick on the wall IW.

It should be noted that the number of the annular projections in a face contacting the wall IW may be three or more as desired.

Figure 5:
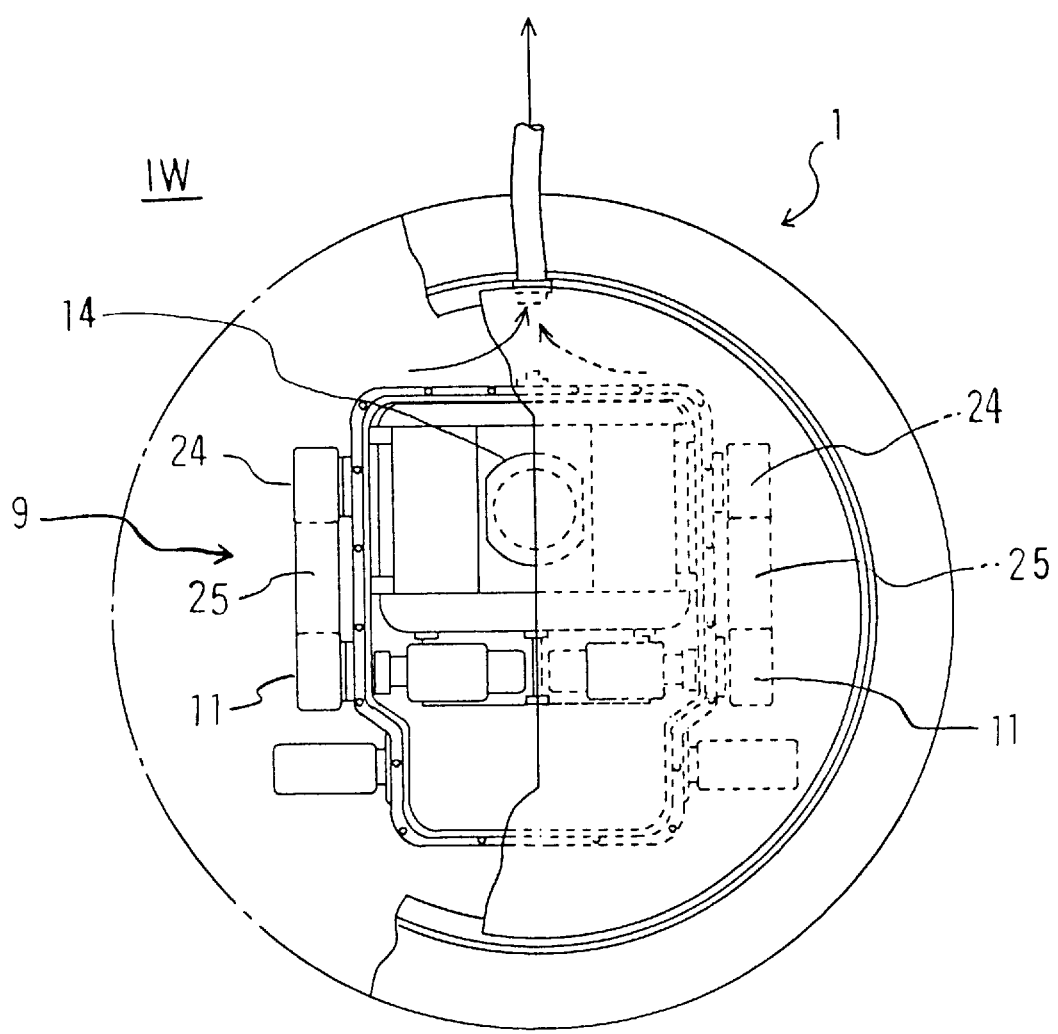
FIG. 5 is a view similar to FIG. 2 and illustrates a plan view of the underwater vehicle according to the second embodiment of the present invention with an approximate left half of a shallow hat-like cover being omitted to show the interior.

Second Embodiment:

A second embodiment will be described with reference to FIG. 5.

Illustrated is a plan view of an underwater vehicle 1 with a shallow basin-like outer cover being half cut to show the interior thereof. The underwater vehicle 1 of this embodiment has a structure similar to the first embodiment but employs a modified drive unit 9 for moving the vehicle on the vertical wall IW. More reliable movement can be expected as compared with the previous embodiment.

The drive unit 9 includes a pair of trailing wheels 24 and 24 in front of a pair of drive wheels 11 and 11 and endless crawlers 25 and 25 engaged over the right and left sets of driving and trailing wheels 24 and 11 respectively.

In this embodiment, the traction between the underwater vehicle 1 and the wall IW is increased since the area of the translation unit 9 in contact with the wall IW is enlarged or determined by the crawlers 25 and 25. Even if moss and weeds make the vertical wall IW slippery, the vehicle can stably move on the wall IW without slipping. Without the crawlers 25 and 25, the drive wheels 11 and 11 may not able to move on a slippery wall with a proper traction force since there is only line contact with the wall IW. In addition, the underwater vehicle 1 is stably supported on the wall IW since it contacts the inner wall IW at the lower surfaces of the right and left crawlers 25. Therefore, the ball caster 14 may be dispensed with.

Figure 6:
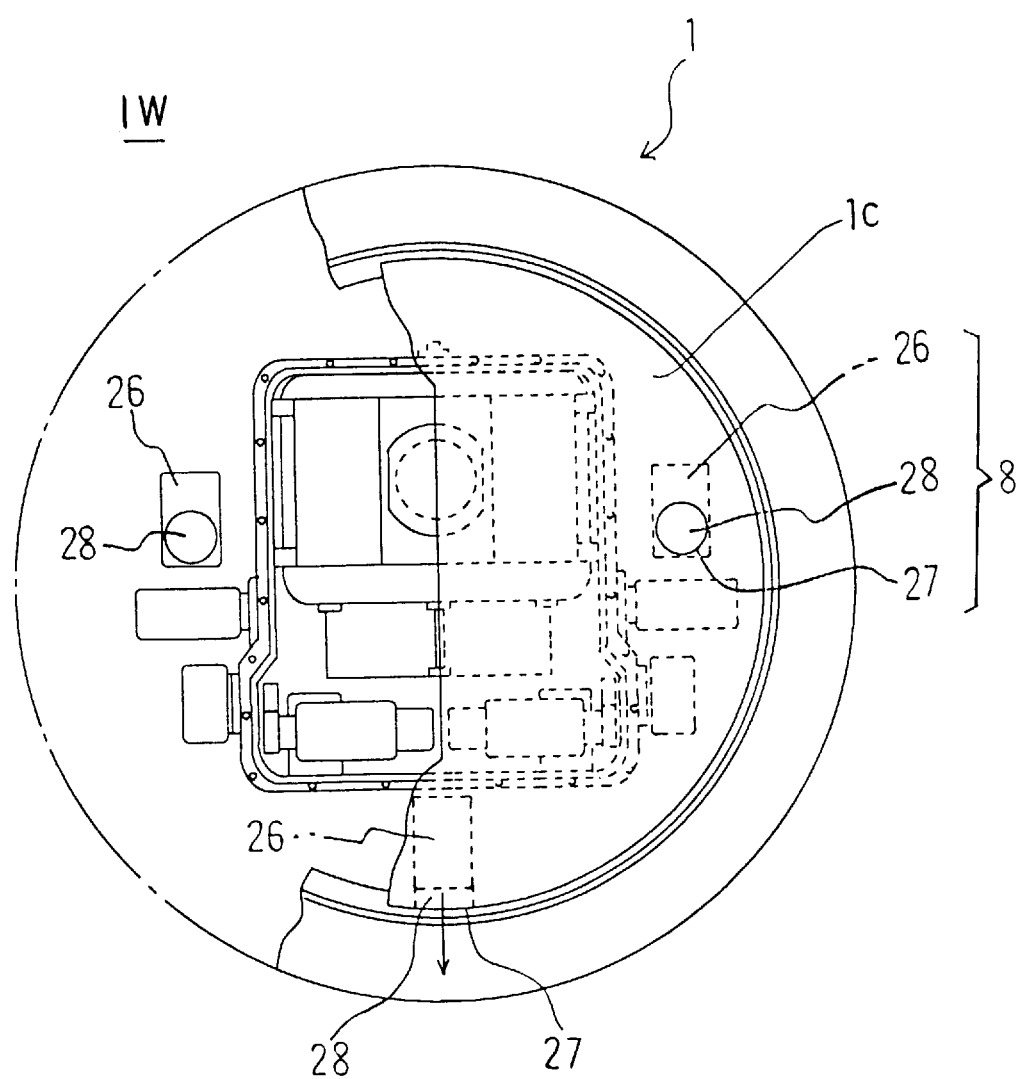
FIG. 6 is a plan view of the underwater vehicle according to the third embodiment of the present invention with a shallow hat-like cover being omitted half.
Figure 7:
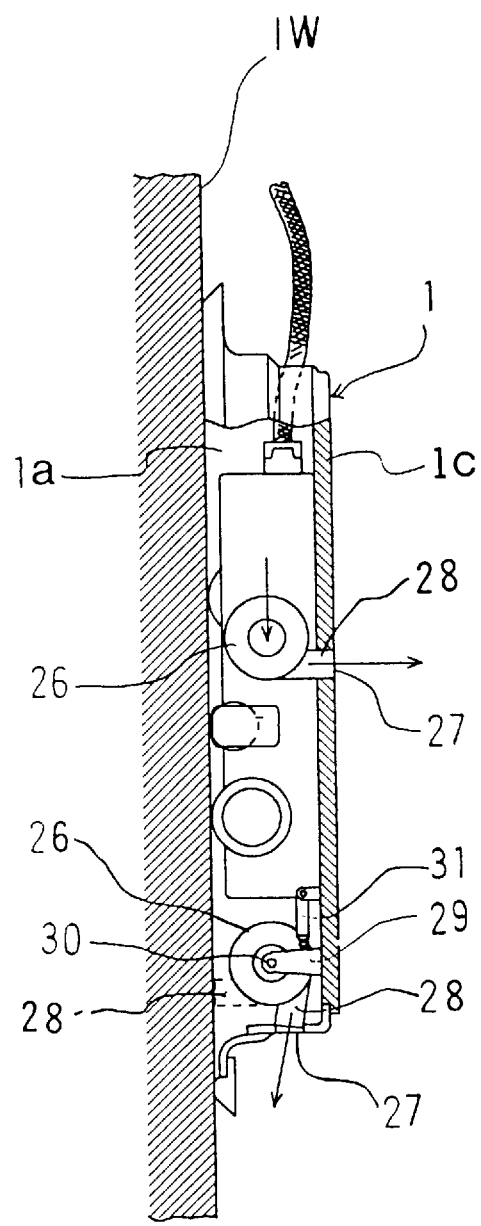
FIG. 7 illustrates a sectional lateral view of the underwater vehicle shown in FIG. 6.

Third Embodiment:

Referring now to FIGS. 6 and 7, a third embodiment of the present invention will be described.

Illustrated in FIG. 6 is a plan view of an underwater vehicle 1 with a shallow basin-like outer cover being half cut to show the interior thereof. The underwater vehicle 1 of this embodiment has a structure similar to the first embodiment but employs a modified suction unit 8. Specifically, instead of the pressure reducing pump 2 and pressure-resistive hose 4 of the suction unit 8 (FIG. 1), a plurality of (two in the illustrated embodiment) submerged water pumps 26 are utilized for reducing the inner pressure of the vehicle 1 to maintain the underwater vehicle 1 on the vertical wall IW.

The pumps 26 are housed in the vehicle 1. A pair of discharge bores 27 is formed in the back surface 1c of the vehicle 1 on right and left sides and outlets 28 of the water pumps 26 are connected with the discharge bores 27 respectively. The pumps 26 sucks the water in the vehicle 1 and discharges it to the outside from the outlet openings 27 of the back 1c of the vehicle 1 so that the inside pressure of the vehicle 1 becomes negative. The water jets produced by the pumps 26 and 26 are directed in a perpendicular direction to the back 1c of the vehicle 1 as indicated by the arrows in FIG. 7. In this embodiment, therefore, it is possible to use these water jets for movement of the vehicle 1 in a direction opposite the water jets. By controlling the rate or amount of water jets (i.e., by adjusting the outputs of the pumps 26 and 26), the vehicle 1 can move in a horizontal direction in the water in a suspended posture.

It should be noted that another outlet opening 27 may be formed in an peripheral wall of the vehicle 1 at the rear as illustrated in FIGS. 6 and 7 and a third water pump 26 may be provided in the vehicle 1 behind the casing 6 such that its discharge port 28 is connected to the third outlet opening 27. The third submerged pump 26 can inject the water from the rear opening 27 as indicated by the arrow in FIG. 7 so that the vehicle 1 can move upward by this water jet.

The third submerged pump 26 may be supported by a pair of brackets 29 extending from the back 1c inwardly and a pin 30 spanning the brackets 29 such that it can rotate about the pin 30 in a predetermined angular range toward its abdomen side 1a upon actuation of a cylinder 31. If the outlet port 28 of the third pump 26 is directed toward the wall IW, the vehicle 1 can leave the wall IW instantaneously upon injection of the water jet.

Fourth Embodiment:

A fourth embodiment of the invention will be described with reference to FIGS. 8 and 9.

The underwater vehicle 1 of this embodiment is similar to that of the first embodiment but employs another suction unit 8. Specifically, instead of the pressure reducing pump 2 and pressure resistive hose 4 (or instead of the submerged pumps 26 in the third embodiment), a plurality of (two in the illustrated embodiment) thrust fan units 32 are used to discharge the water out of the vehicle 1.

The function or role of the thrust fan units 32 is fundamentally similar to that of the submerged pumps 26 shown in FIGS. 6 and 7. The back 1c of the vehicle 1 has a pair of openings 27 on right and left sides. The suction unit 8 of this embodiment includes a pair of ducts 27a and 27a fitted in the openings 27 respectively to extend inward from the back 1c toward the abdomen a predetermined depth (FIG. 9), a pair of fans 33 provided in the associated ducts 27a and drive motors 34, for actuating the fans 33. The drive motors 34 are driven independently. In this embodiment, two of the drive motors 34 are connected in series and used to drive one fan unit 32 and the other two drive motors 34 are used to drive the other fan unit 32. The power of the motors 34 is transmitted to the associated fan unit 32 by a belt 35. The thrust fan units 32 and 32 are activated to inject the water out of the vehicle 1 from the openings 27 formed in the back 1c through the ducts 27a in a direction perpendicular to the wall IW as indicated by the arrows in FIG. 9, like the submerged pumps 26 of the previous embodiment. By discharging the water from the vehicle 1, the inner pressure of the vehicle 1 becomes negative so that the vehicle 1 adheres on the vertical wall IW. The water jets created by the fan units 32 cause the underwater vehicle 1 to translate in a direction opposite the water jets (or toward the wall IW). Furthermore, it is also feasible to translate the vehicle 1 in the direction of the arrows shown in FIG. 9 by reversing the rotational direction of the fans 33 so as to introduce the water into the vehicle 1, and to rotate the vehicle 1 about its center axis Z by rotating the fans 33 in opposite directions while maintaining the suspended posture in the water.

Figure 10:
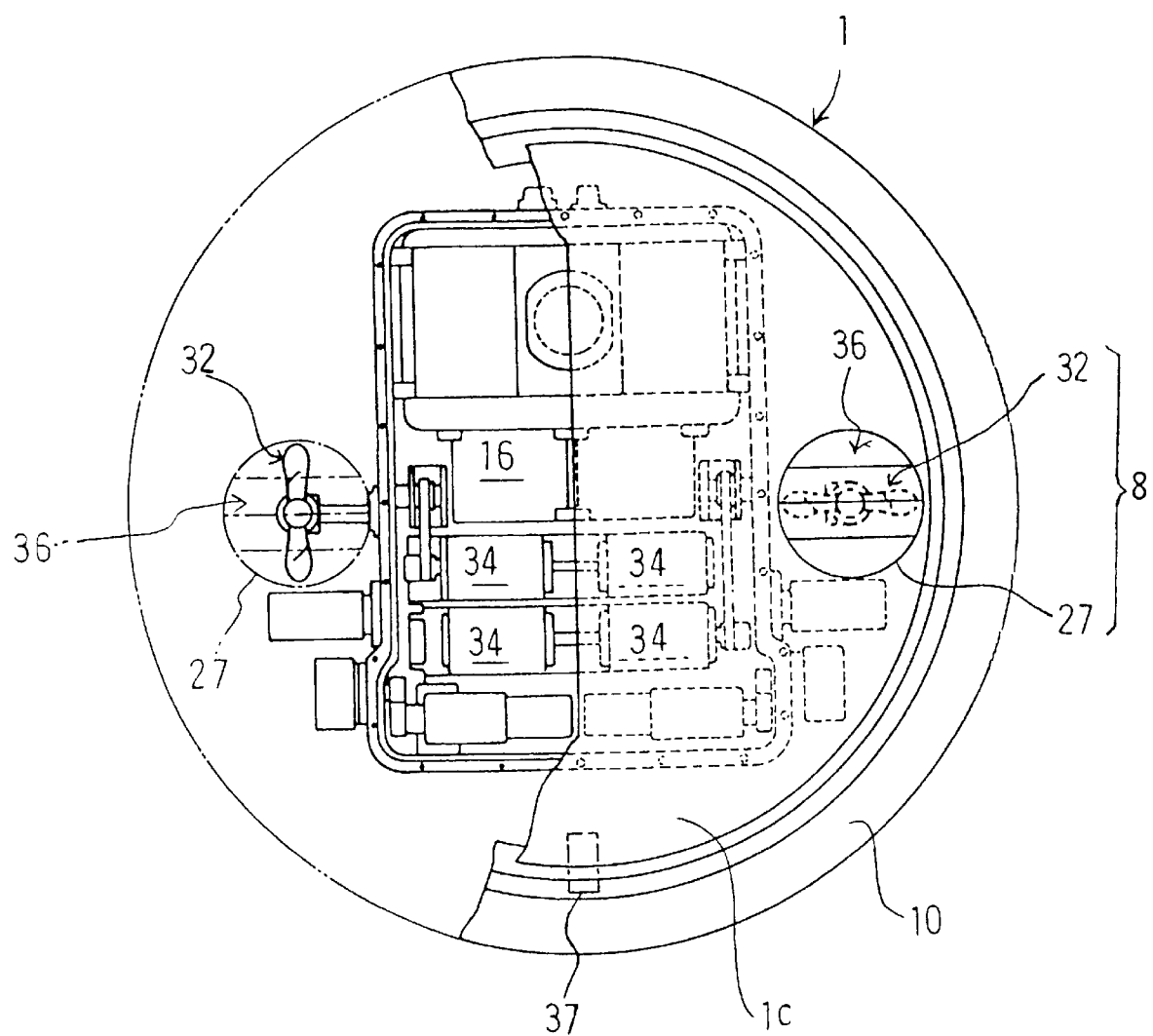
FIG. 10 is a view similar to FIG. 8 and illustrates a plan view of an underwater vehicle according to a fifth embodiment of the present invention.
Figure 11:
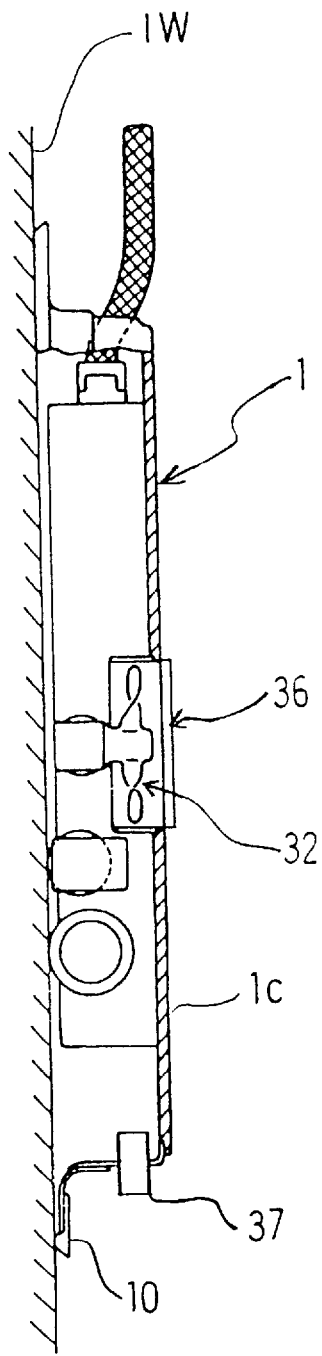
FIG. 11 is a sectional lateral view of the vehicle shown in FIG. 10.
Figure 12:
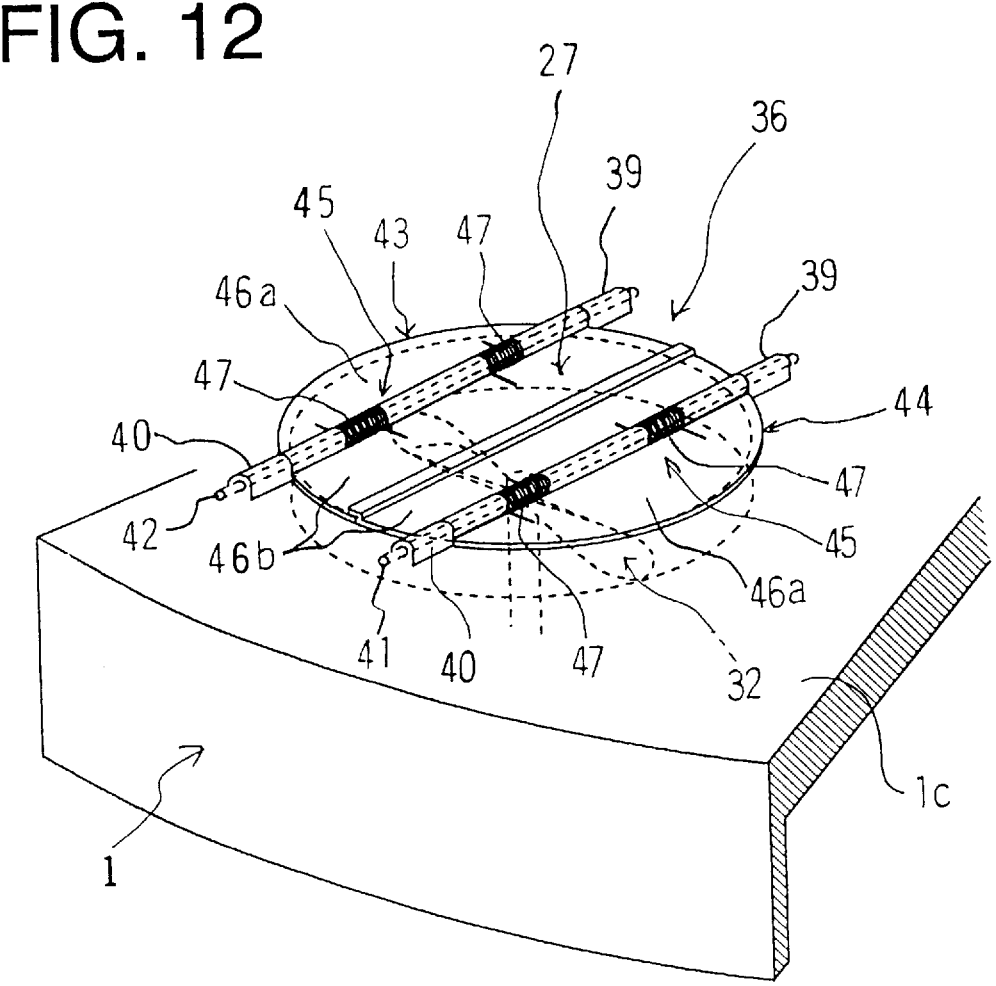
FIG. 12 illustrates an enlarged "bird's-eye" or perspective view of a thrust fan used in the underwater vehicle shown in FIG. 10.

Fifth Embodiment:

Referring to FIGS. 10 to 12, an underwater vehicle 1 according to a fifth embodiment of the present invention will now be described.

Figure 8:
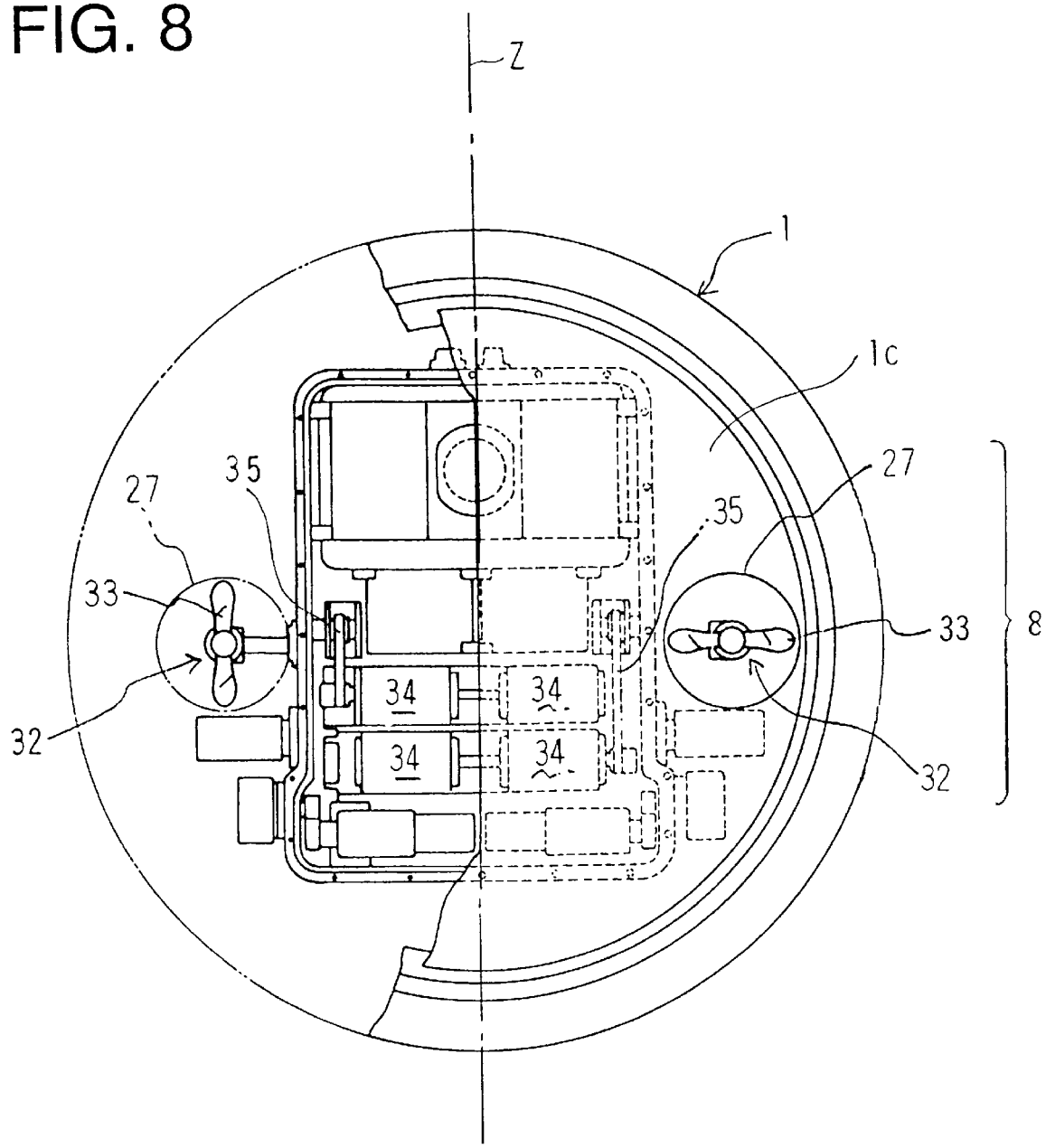
FIG. 8 is an illustration similar to FIG. 6 and illustrates a plan view of the underwater vehicle according to a fourth embodiment of the present invention.
Figure 9:
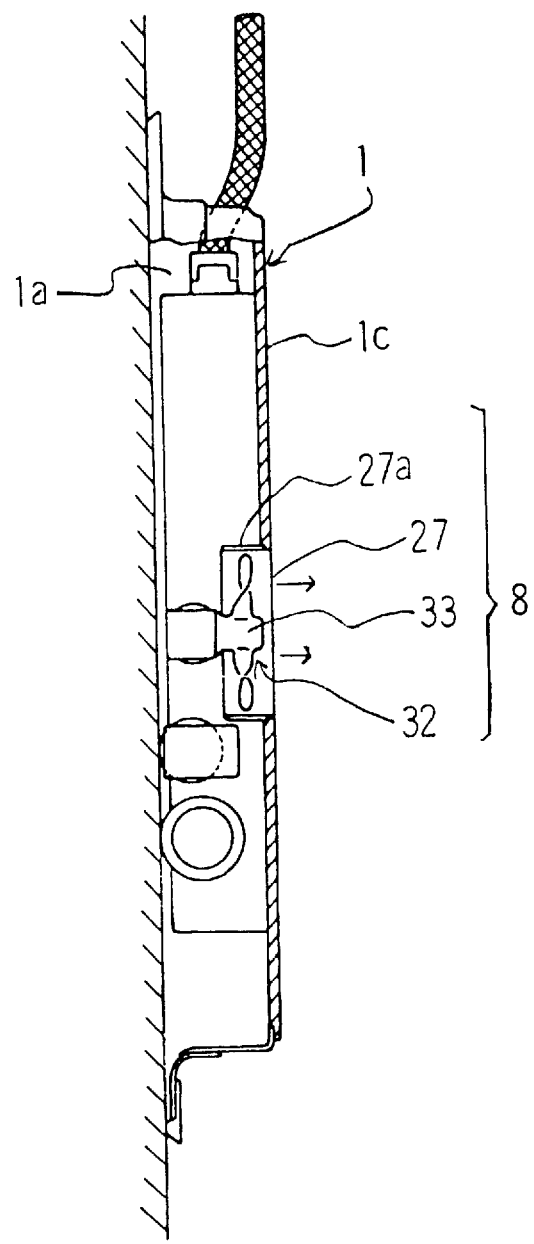
FIG. 9 is a sectional lateral view of the vehicle shown in FIG. 8.

FIGS. 10 and 11 are similar views shown in FIGS. 8 and 9 respectively. FIG. 10 illustrates a plan view of the underwater vehicle 1 with an approximate left half of a shallow hat-like cover being cut and FIG. 11 illustrates a lateral view of the underwater vehicle 1.

The structure of the underwater vehicle 1 of this embodiment is generally similar to that of the vehicles 1 described in the foregoing embodiments and particularly to that of the vehicle 1 according to the fourth embodiment but uses a modified suction unit 8. This suction unit 8 also includes thrust fan units 32 like the previous embodiment shown in FIGS. 8 and 9.

In this embodiment, check valve mechanisms 36 are provided in the water discharge openings 27 formed in the back of the vehicle 1. These check valve mechanisms 36 are opened and closed due to pressure difference between the inside and outside of the vehicle 1. A switch 37 for turning on and off the thrust fan units 32 is also provided in the lateral wall of the vehicle 1 at the rear. The switch 37 is activated upon generation of a certain pressure difference. Specifically, when the pressure difference between the inside and outside of the vehicle 1 is insufficient to maintain the vehicle 1 on the vertical wall, the switch 37 turns on the thrust fans.

The check valve mechanisms 36 have the same construction. The detail of one of the check valve mechanisms 36 is depicted in FIG. 12. A seal member (not shown) is attached along the periphery of the discharge opening 27. Two pairs of boss members 39 and 40 project outward from the seal member 38 in the width direction of the vehicle 1 respectively. Each pair of bosses 39 and 40 defines between themselves an imaginary chord which transversely cross the circle of the opening 27 off the center of the opening 27. The bosses 39 and 40 of each pair are formed at opposite positions in line. Each of the boss members 39 and 40 extends parallel to the back surface 1c of the vehicle 1. The inner boss members 39 extend in parallel to each other and are spaced from each other in the front and rear direction of the vehicle 1 and the outer boss members 40 likewise extend in parallel to each other and are spaced from each other. The front pair of bosses 39 and 40 supports a first shaft 42 and the rear pair of bosses 39 and 40 supports a second shaft 41. These shafts 41 and 42 extend along the above mentioned imaginary chords defined by the bosses 39, 39, 40 and 40 respectively and are parallel to each other. First and second flaps 43 and 44 which are semicircular are placed over the opening 27 to close the opening 27. Each of the flaps 43 and 44 has a hinge 45 on its upper face. The first shaft 41 extends through the hinge 45 of the first butterfly-type flap 43 and the second shaft 42 extends through the hinge 45 of the second flap 44. Each of the flap valves 43 and 44 includes two flap segments 46a and 46b which can pivot upwardly about the associated shaft 41 or 42 or hinge 45 or 45 like a butterfly. Each hinge 45 is provided with two closing elements 47 which forces the flap segments 46a and 46b downward to close the opening 27. Each closing element 47 may be a coil spring having a cylindrical winding portion which loosely or tightly holds the hinge 45 and two free ends which extend like legs over the upper surface of the flap segments 46a and 46b and basis the flap segments downwardly.

Referring back to FIG. 10, the differential pressure switch 37 is directly coupled with the thrust fan units 32 and 32 or with the control board 16 and/or main controller 3 (FIG. 1) which controls the thrust fan units 32 and 32. The differential pressure switch 37 detects pressure difference between the outside and inside of the vehicle 1 and deactivates the thrust fan units 32 and 32 if the pressure difference becomes enough for movement of the vehicle 1 on the wall IW, i.e., if it becomes larger by a certain amount than a value which is necessary for the vehicle 1 to move on the wall IW whereas it activates the thrust fan units 32 and 32 if the pressure difference becomes smaller than a predetermined value in order to discharge the water from the interior of the vehicle 1 and reduce the inner pressure of the vehicle 1.

The springs 47 are constructed such that the flap valve segments 46a and 46b are opened or pivoted upward from their closing positions when the thrust fan units 32 are driven to discharge the water out of the vehicle 1.

In this embodiment, when the differential pressure switch 37 detects that there is sufficient pressure difference between the inside and outside of the vehicle 1 for movement of the vehicle, the switch 37 or the controller 16/3 sends a signal to deactivate the drive motors 34 of the thrust fan units 32 for stoppage of the fan units 32. As a result, the water jets from the openings 27 to the outside of the vehicle 1 stop and simultaneously the springs 47 push back the flap valve segments 46a, 46b, 46a and 46b downward to close the openings 27. Accordingly, no water comes into the vehicle through the openings 27 and the negative pressure condition in the vehicle 1 is maintained.

It should be noted that a certain amount of water is allowed to flow into the vehicle 1 between the skirt 10 and the wall IW. Therefore, the inner pressure of the vehicle 1 gradually rises and the pressure difference between the inside and outside of the vehicle 1 is reduced. When the pressure difference becomes smaller than the predetermined value, i.e., when it is not possible to keep the vehicle 1 on the vertical wall IW, then the thrust fan units 32 are driven again to reduce the inner pressure of the vehicle 1. The thrust fan units 32 are operated until the inner pressure is reduced to a particular value. When the thrust fan units 32 are reactivated, the flap valves 43 and 44 are closing the openings 27. However, the water jets created by the thrust fans 32 can open the valves 43 and 44.

As understood from the above description, by always detecting the pressure difference between the inside and outside of the vehicle 1 by the differential pressure switch 37 and activating/deactivating the thrust fans 32 depending upon the pressure difference, the drive motors 34 of the thrust fans 32 are not necessarily operated all the time. Accordingly, it is possible to effectively utilize the thrust fans 32 and in turn to improve cost performance and durability of the underwater vehicle 1.

Sixth Embodiment:

All the embodiments described above and illustrated in FIGS. 1 through 12 relate to a light-weight and compact underwater vehicle which can smoothly and economically move on the vertical wall in the water. However, this type of vehicle needs various additional components to carry out desired operations and working under the water. One embodiment according to the present invention which can perform inspection, cleaning or the like in the water will be described with reference to FIGS. 13, 14A and 14B.

The underwater vehicle 1 of this embodiment includes a first cleaning unit 48 for cleaning a surface of the vertical wall IW.

Figure 13:
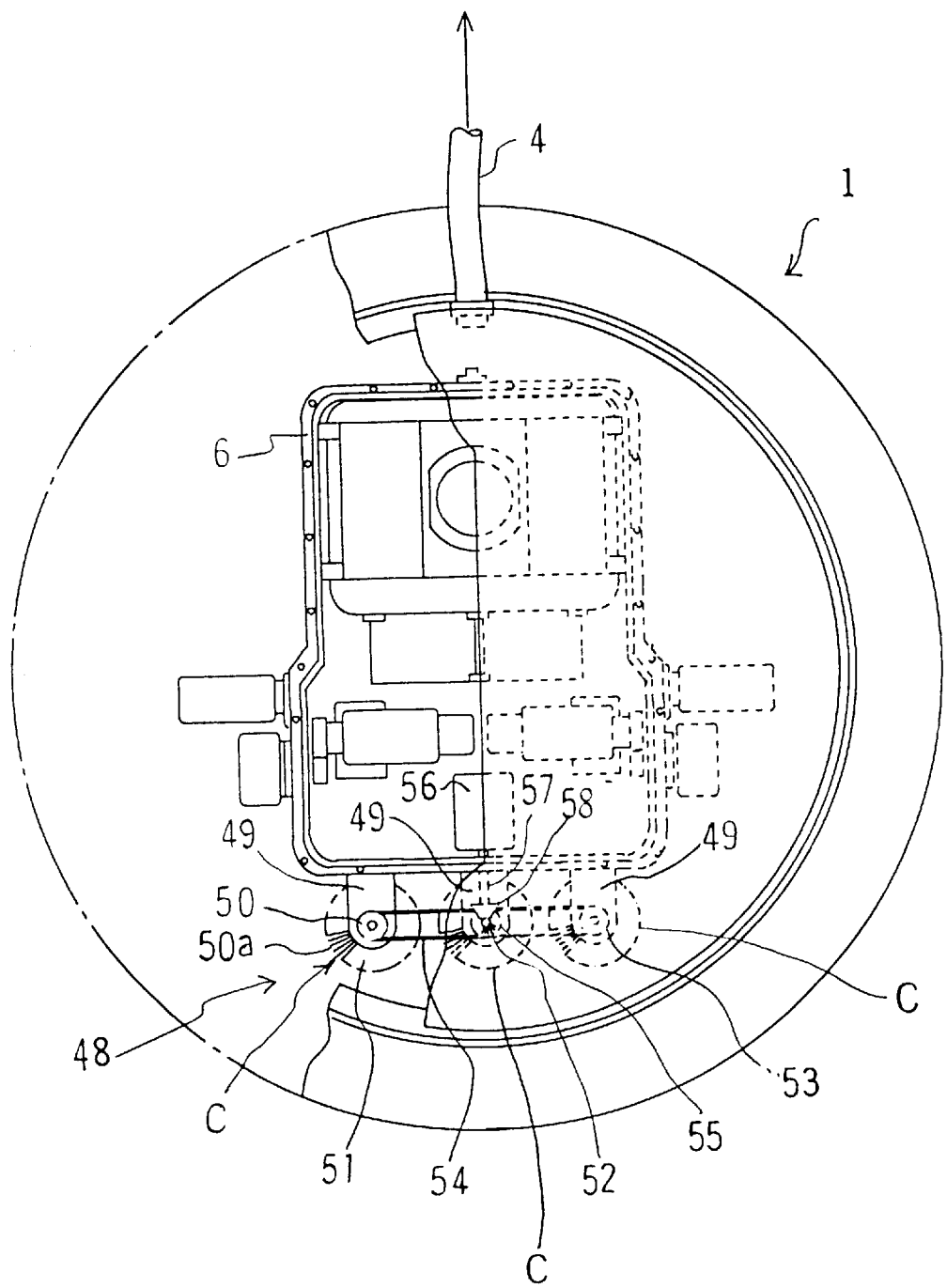
FIG. 13 is a view similar to FIG. 2 and depicts a plan view of an underwater vehicle equipped with a first cleaning unit according to a sixth embodiment of the invention.
Figures 14A, 14B:
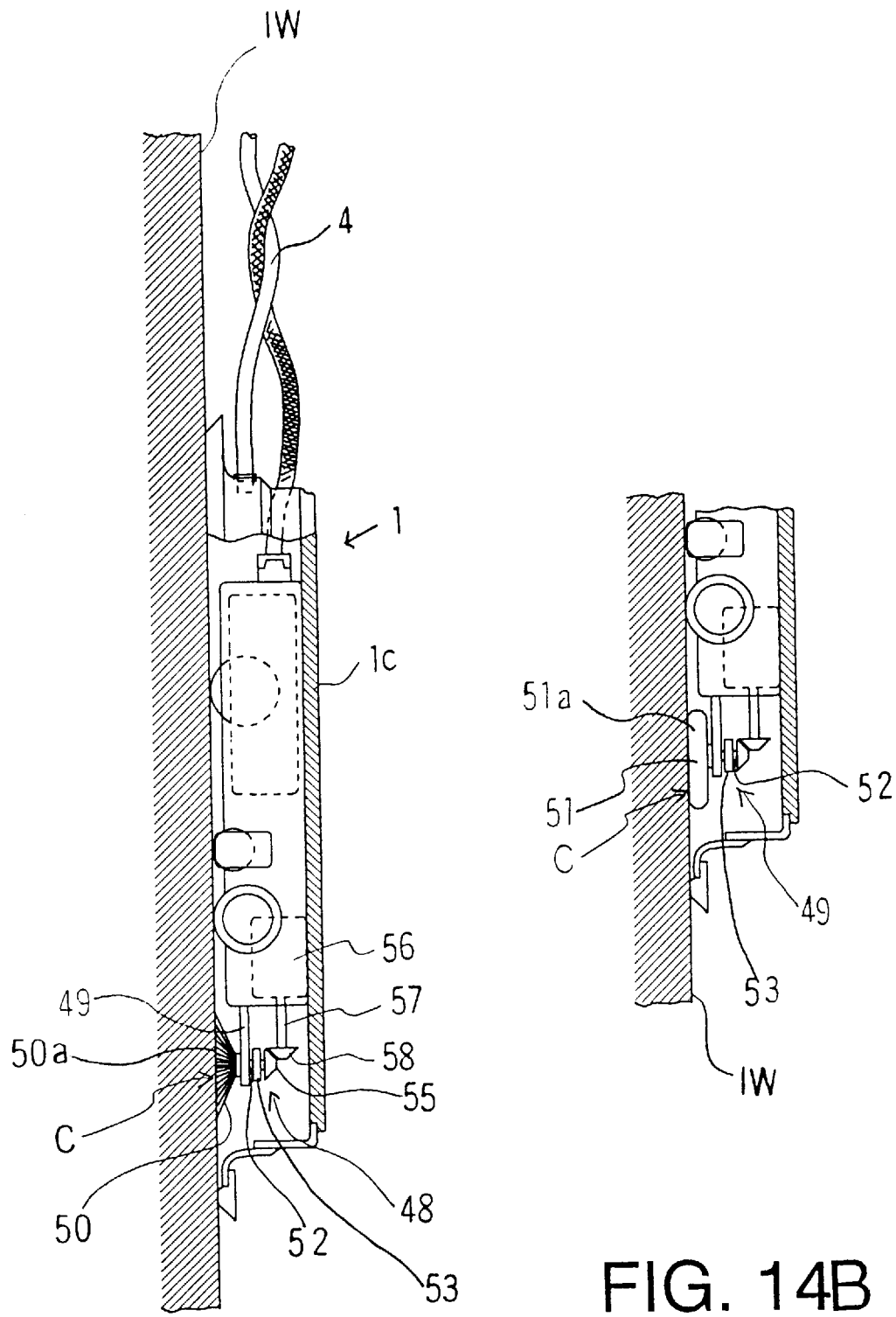
FIG. 14A is a lateral sectional view of the underwater vehicle shown in FIG. 13.
FIG. 14B illustrates a fragmentary sectional view of the vehicle shown in FIG. 13 equipped with a modified cleaning unit.

The first cleaning unit 48 includes a plurality of (three in this particular embodiment) support members 49 extending in parallel outwardly from the rear of the casing 6 inside the vehicle 1 and cleaning elements C, C and C respectively supported by these support members 49 via bearings (not shown). The three cleaning elements C are arranged in line in the width direction of the vehicle 1 behind the rear of the casing 6. Each cleaning element C may be a rotary brush such as nylon brush and wire brush 50 as shown in FIGS. 13 and 14A or rotary file 51 as shown in FIG. 14B. Each support member 49 holds the associated brush 50 or file 51 such that the brush or file abuts the wall surface IW so that activation of the brush or file results i n cleaning or grinding of the wall surface. As illustrated in FIG. 14A, the shaft 52 of the rotary brush 50 extends vertically toward the wall surface IW from the associated support member and the rotary brush 50 rotates about the shaft 52. The brush 50 has a number of hairs 50a to sweep dusts or the like on the wall surface IW. The file 51 shown in FIG. 14B also has a shaft 52 extending toward the wall surface IW and a grinding element 51a attached to the free end of the shaft 52. The grinding element 51a abuts the wall surface IW.

Referring to FIG. 14A, each shaft 52 extends through the associated support member 49 upward and a sheave or pulley 53 is mounted on the shaft 52 above the support member 49. As understood from FIG. 13, the three sheaves 53 are aligned in the plan view and belts 54 are engaged over each two adjacent sheaves 53. Accordingly, the three shafts 52 are rotated simultaneously. The middle shaft 52 also has a bevel gear 55 at the top of the shaft 52 as best seen in FIG. 14A. This bevel gear 55 meshes with another bevel gear 58 mounted on an end of a drive shaft 57 of a cleaning unit motor 56 provided in the casing 6. Actuation of the motor 56 causes all of the brushes 50 to rotate at the same time. It should be noted that the bevel gear 55 may be attached to the left or right shaft 52.

Therefore, this underwater vehicle 1 is able to clean the wall surface IW using its cleaning unit 48 while it is moving on the wall. In other words, it is possible to sweep rusts, shells, weeds, dusts, etc. adhering on the wall surface existing in its traveling course and grind the wall surface. The rusts taken away form the wall surface upon sweeping and particles generated upon grinding are collected by the hose 4 and in turn carried to the outside of the vehicle 1 together with the water by actuating the pressure reducing pump 2 (FIG. 1). Consequently, the rusts and particles produced by the cleaning operation of the cleaning unit 48 do not contaminate the water.

In this embodiment, the three cleaning elements C are driven at the same time by a single drive motor 56. However, it should be noted that each cleaning element C may be provided with its own drive motor and the three cleaning elements C may be driven independently. In addition, the cleaning elements C are provided along the rear wall of the casing 6. However, further cleaning elements C may also be provided along the front wall and/or side walls of the casing 6 as long as there is a space therefor.

The suction means 8 of this embodiment is the same as the first embodiment, i.e., it includes the pressure reducing pump 2 and pressure-resistive hose 4. However, it may include submerged pumps 26 shown in FIG. 6 or thrust fans 32 shown in FIG. 8. When the submerged pumps 26 or thrust fans 32 are employed, the rusts and particles removed from the wall surface IW are disposed from the vehicle 1 into the neighboring water and it may contaminate the water or make the water muddy. In such a case, a dust collector may be provided to cover at least the openings 27 formed in the back 1c of the vehicle 1. The water containing the dust such as the rusts and particles is injected from the openings 27 to the neighboring water.

Figure 15:
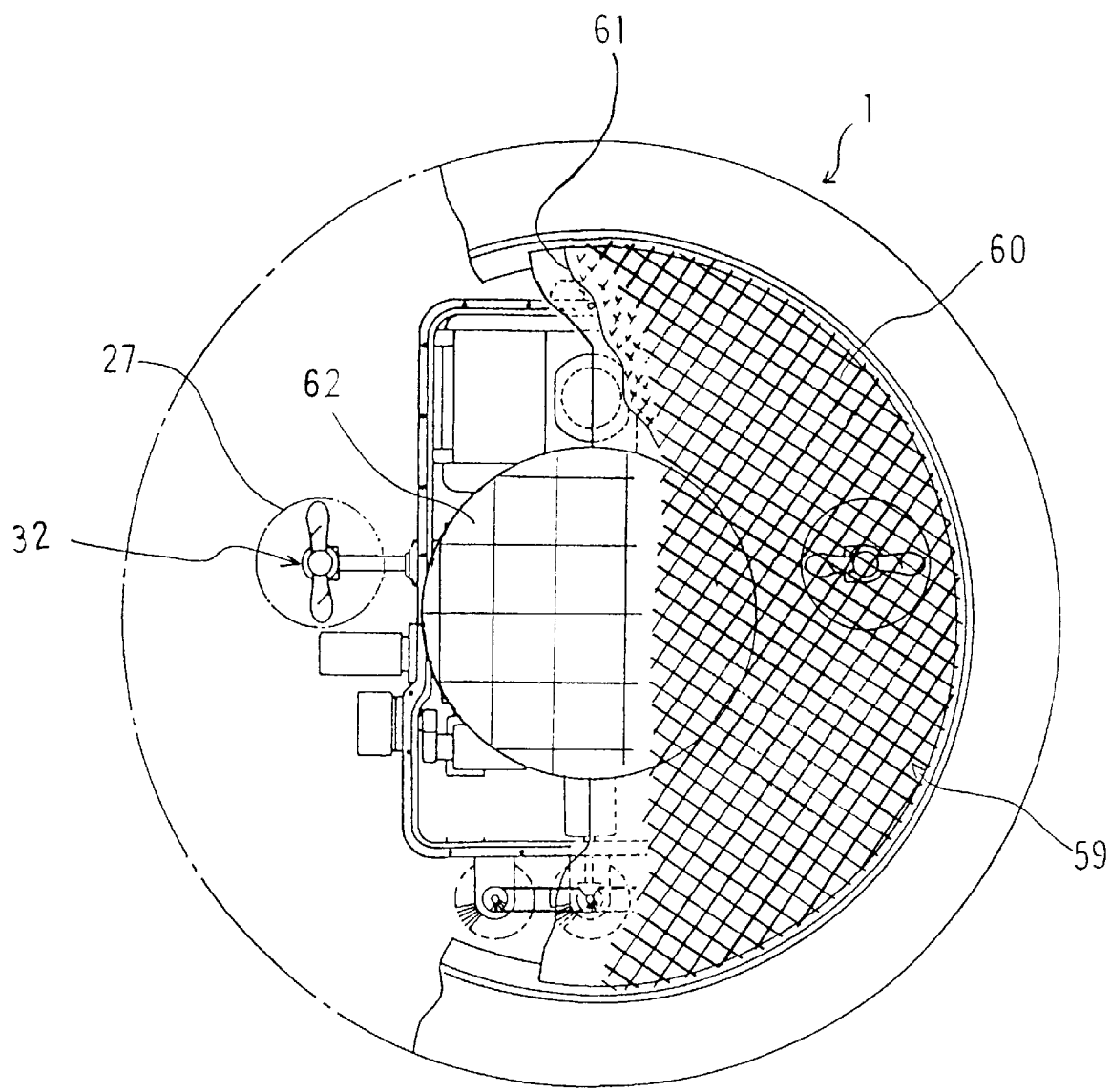
FIG. 15 is a view similar to FIGS. 10 and 13 and shows a plan view of an underwater vehicle equipped with a cleaning unit as well as a dust collector.

One example of the dust collectors is depicted in FIG. 15 and designated at 59. The illustrated dust collector 59 includes a wire gauze or screen 60 which covers the whole of the back 1c of the vehicle 1. A filter 61 made from, for example, a unwoven fabric may be attached to the wire screen 60. It should be noted that the dust collector 59 should not weaken the water jets of the thrust fans 32 and 33. Accordingly, care should be taken in determining coarseness of the screen 60 and filter 61. Inside the dust collector 59, a metal attraction element such as magnet 62 may further be provided to collect metallic particles removed from the wall surface IW by the rotating file C or the like. The illustrated attraction element 62 is a sheet magnet.

It should be noted that the dust collector 59 does not have to cover the back 1c of the vehicle 1 entirely as long as it is possible to prevent contamination of the water.

Figure 16:
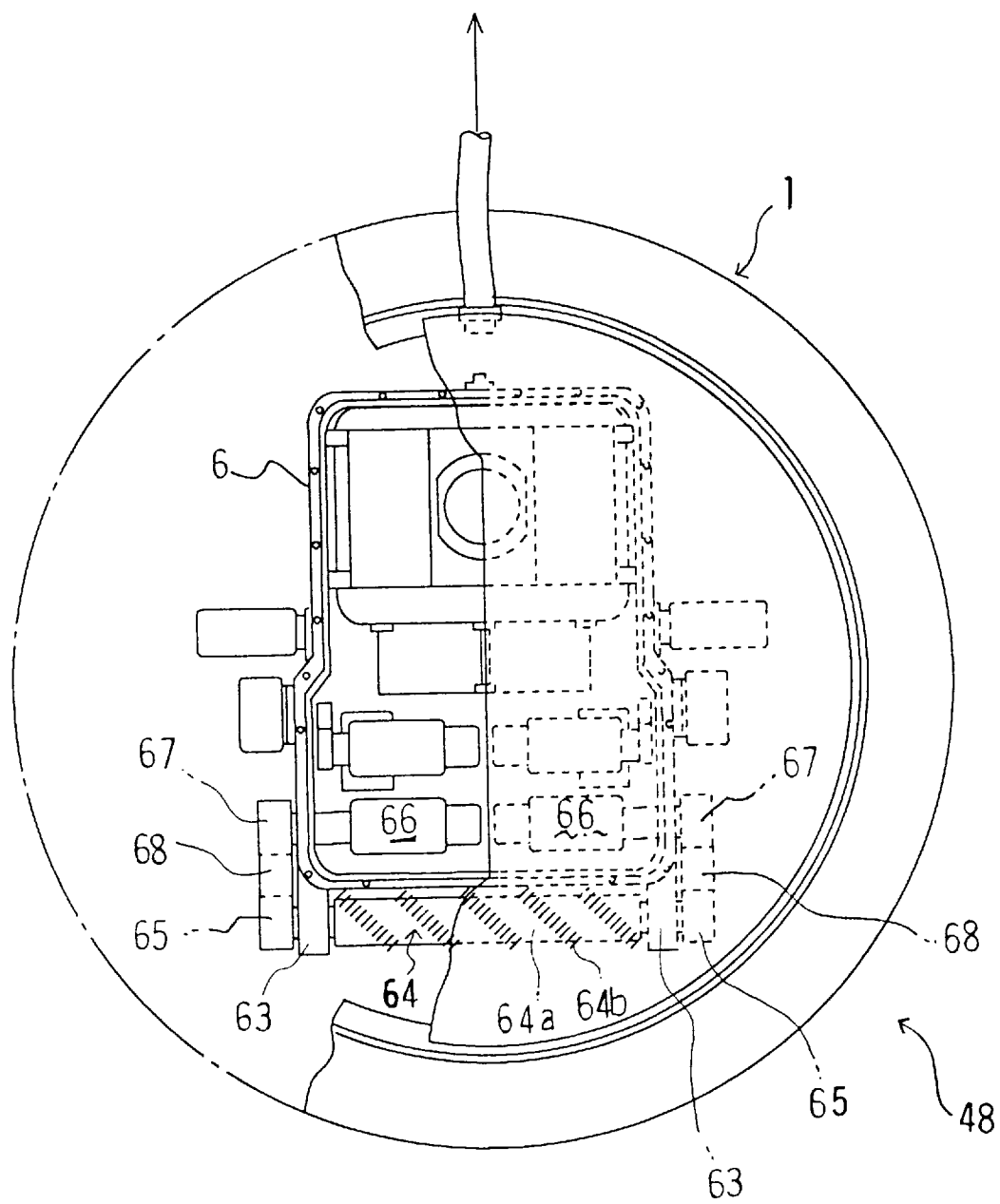
FIG. 16 is a view similar to FIG. 13 and illustrates a plan view of an underwater vehicle equipped with a still modified cleaning unit.

FIG. 16 depicts a modification of the cleaning unit 48 of the previous embodiment. Specifically, the cleaning unit 48 includes a pair of parallel support members 63 extending from the rear of the casing 6 outwardly and a rod-shaped rotary brush 64 spanning these support members 63. The elongated rotary brush 64 extends in parallel to the rear of the casing 6 and its ends are supported by the support members 63. The rotary brush 64 has a shaft 64a and brush hairs 64b around the shaft 64a. The rotary brush 64 is supported such that the hairs 64b contacts the wall surface IW. As the shaft 64a is rotated, the brush hairs 64b sweeps the wall surface IW. A pair of motors 66 is located in the casing 6 for driving the rotary brush 64 or more specifically for rotating the shaft 64a. Pulleys 67 are mounted on ends of output shafts of the drive motors 66 respectively at positions outside the casing 6 and another pulleys 65 are mounted on ends of the shaft 64a of the brush 64 respectively. The left pulleys 65 and 67 are aligned along the left side of the casing 6 and the right pulleys 65 and 67 are also aligned along the right side. Left and right endless belts 68 are engaged over the left pulleys 65 and 67 and the right pulleys 65 and 67 respectively. Accordingly, as the drive motors 66 are activated together, the power of the drive motors are transmitted to the rotary brush 64 via the pulleys 67, belts 68 and pulleys 65.

The cleaning unit 48 can sweep a larger area than the cleaning unit 48 shown in FIG. 13.

It should be noted that the support members 63 may be adapted to pivot upwardly with its pivot center being connection of itself with the rear of the casing 6. With such a structure, the support members 63 may be pivoted upward to cause the rotary brush 64 to leave the wall surface IW when it is unnecessary to sweep the wall surface while the vehicle 1 is moving on the wall. Only when the sweeping of the wall surface is needed, the support members may be loaded down to make the brush 64 contact the wall surface IW.

Figure 17:
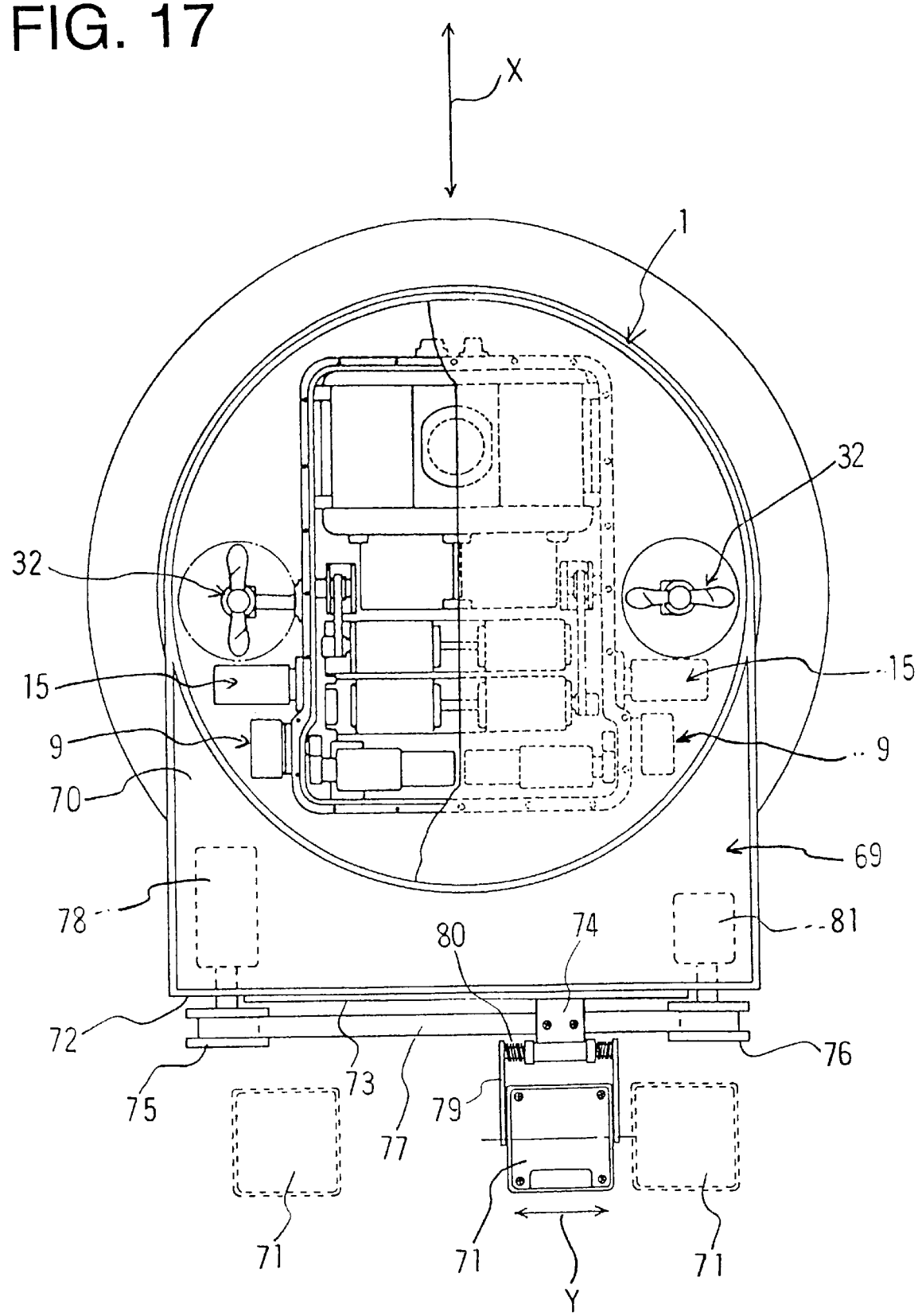
FIG. 17 depicts a partly sectioned plan view of a vehicle equipped with an ultrasonic probe (i.e., flaw detector) according to a seventh embodiment of the present invention.
Figure 18:
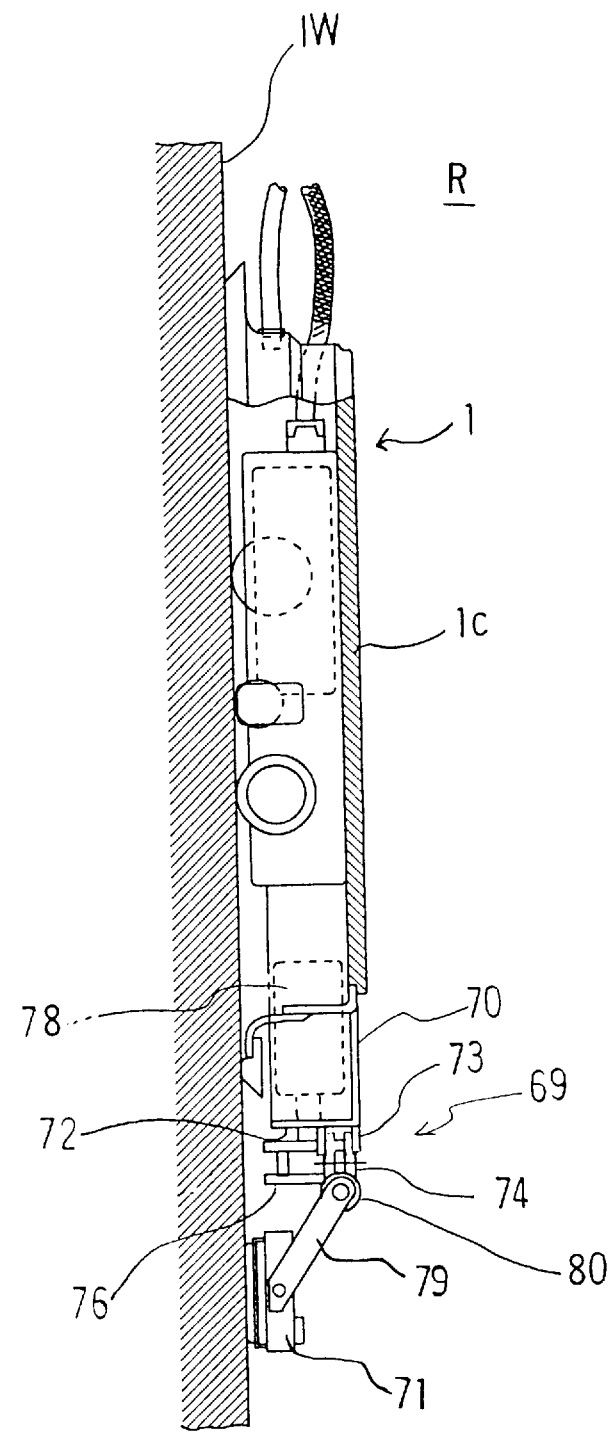
FIG. 18 illustrates a sectional lateral view of the vehicle shown in FIG. 17.

Seventh Embodiment:

Referring to FIG. 17, an underwater vehicle 1 according to a seventh embodiment of the invention is equipped with an ultrasonic probe 69. Its lateral view is shown in FIG. 18. The ultrasonic prove 69 is one example of underwater inspection means. In particular, the ultrasonic probe 69 is used to detect flaws and cracks in the steel plate-made wall IW of a reactor pressure vessel R.

The ultrasonic probe 69 includes a mounting element 70 attached to the rear half of the circular vehicle 1 so as to project rearwardly as illustrated in FIG. 17 and an ultrasonic probe 71 slidably mounted at the rear of the mounting element 70. The ultrasonic probe 71 is slidable in the width direction of the vehicle 1 as indicated by the double arrow Y.

As best shown in FIG. 18, the mounting element 70 has an L-shaped cross section, one leg of the "L" extending in the same plane as the back 1c of the vehicle 1 and the other leg bending at the right angle toward the wall surface IW. The flat and rectangular rear wall 72 of the mounting element 70 is defined by the above-mentioned "the other leg". A linear guide 73 is provided along the rear wall 72 such that it extends in parallel to the wall surface IW, and a guide member 74 which is movable along the linear guide or rail member 73 is also provided as illustrated in FIG. 17. The guide member 74 projects rearwardly from the linear guide 73. Near the ends of the linear guide 73 and behind the rear wall 72 of the mounting element 70, provided are timing pulleys 75 and 76 and an endless timing belt 77 engaged over the timing pulleys 75 and 76. The guide member 74 is fixed on the timing belt 77. The left pulley 75 has a shaft extending forwardly and connected to a drive motor 78 located inside the mounting element 70. Actuation of the drive motor 78 results in reciprocal movement of the guide 74 along the linear guide 73. The guide 74 has a U-shaped arm 79 which is directed rearwardly (downward direction in FIG. 17). The arm 79 is supported by the guide 74 such that it is pivotable about its center piece. A spring 80 is wound around the center piece of the U-shaped arm 79 such that the arm 79 (more specifically, the side pieces of the arm 79) is normally biased toward the wall surface IW as shown in FIG. 18. The arm 79 supports the ultrasonic probe 71 between its side pieces (FIG. 17). Since the arm 79 is forced to the wall surface IW, the ultrasonic probe 71 contacts the wall surface (FIG. 18).

As the drive motor 78 is operated, the power of the motor is transmitted to the pulley 75 so that the belt 77 and guide 74 fixed on the belt 77 can move in the width direction of the vehicle 1. As the guide 74 is moved right and left, the ultrasonic detector 71 supported by the arm 79 of the guide 74 is also moved right and left.

When the underwater vehicle 1 adheres on the wall surface IW, the ultrasonic probe 71 contacts the wall surface as shown in FIG. 18. By moving the vehicle 1 in the up or down direction in the illustration while the ultrasonic probe 71 is being moved in a direction perpendicular to the drawing sheet (i.e., in the width direction of the underwater vehicle 1 as depicted by the phantom lines in FIG. 17), it is possible to inspect a particular area on the wall surface IW. The ultrasonic probe 71 scans the wall IW of the reactor pressure vessel R and receives a reflection to analyze it for detection of presence, positions and sizes of flaws and cracks inside the wall IW in a non-destructive manner (non-destructive test).

In FIG. 17, numeral 81 designates a potentiometer which is connected to the right pulley 76. The potentiometer 81 counts the number of rotations of the timing pulley 76 to detect the position of the ultrasonic detector 71 relative to the guide member 73.

Eighth Embodiment:

Next, a method of determining the position of the underwater vehicle in the water and positioning the underwater vehicle on the wall IW at a desired position will be described.

It is necessary to know an accurate position of the vehicle 1 on the wall IW in order to perform various jobs in the water using the vehicle 1 by a remote control technique. Particularly, when the vehicle 1 is utilized to detect the presence and positions of internal defects such as flaws and cracks in the wall of the reactor pressure vessel R, it is quite important to know the accurate position of the underwater vehicle 1.

Conventionally, a reference point is made on the wall IW at a predetermined position and an ultrasonic or laser rangefinder (device for measuring a distance to the vehicle 1 from the device) is placed at the reference point. Using such a range finder together with the planimeters 15 incorporated in the vehicle 1, the position of the vehicle 1 relative to the reference point is determined and in turn the absolute position of the vehicle 1 is calculated.

However, since the vehicle 1 is in the water, the ultrasonic wave or laser beam from the range finder and reflected by the vehicle is attenuated by the water between the range finder and the vehicle 1. Irregular reflection also occurs likely. Accordingly, the accurate position detection is practically impossible. Accurately positioning the vehicle is also difficult.

The present invention provides a method of accurately detecting the position of the vehicle under the water and accurately positioning the vehicle.

Figure 19:
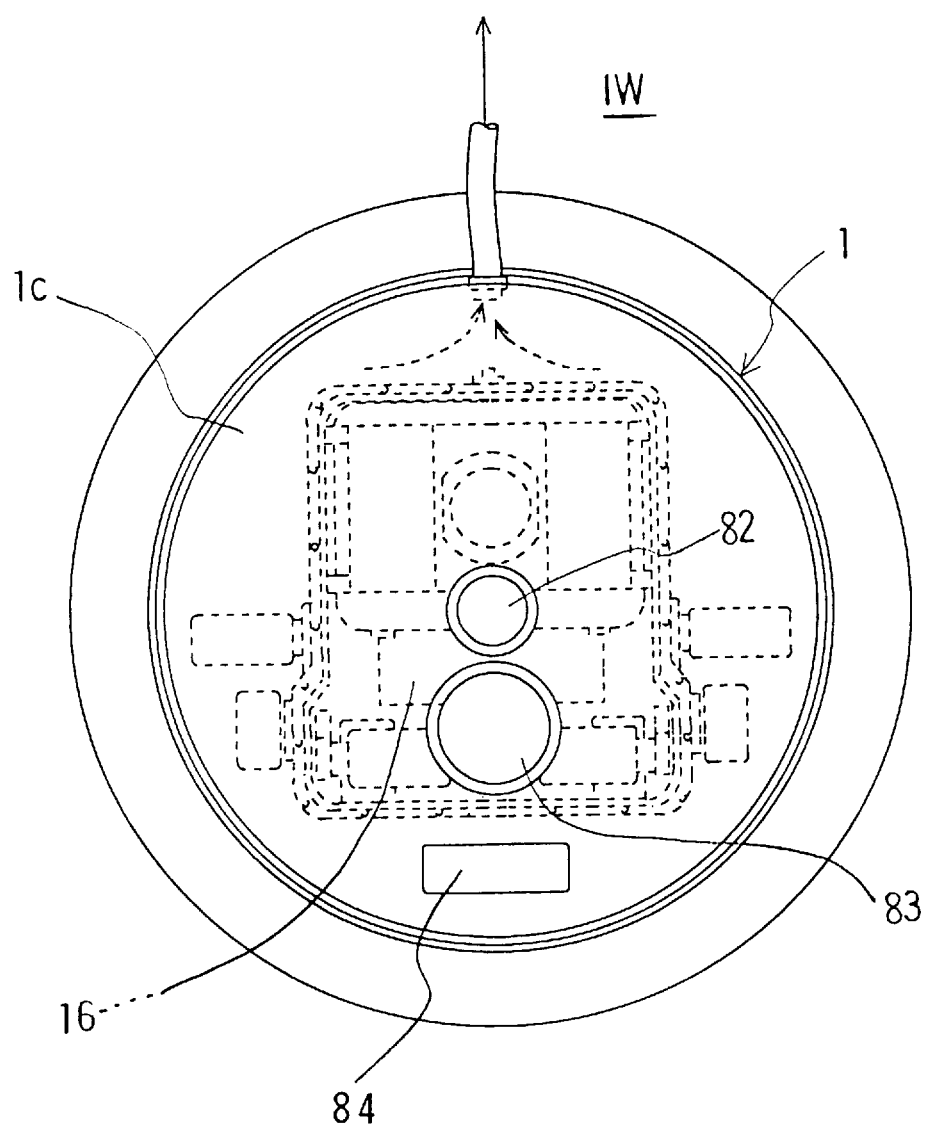
FIG. 19 is a plan view of an underwater vehicle equipped with a position detector according to an eight embodiment of the invention.
Figure 20:
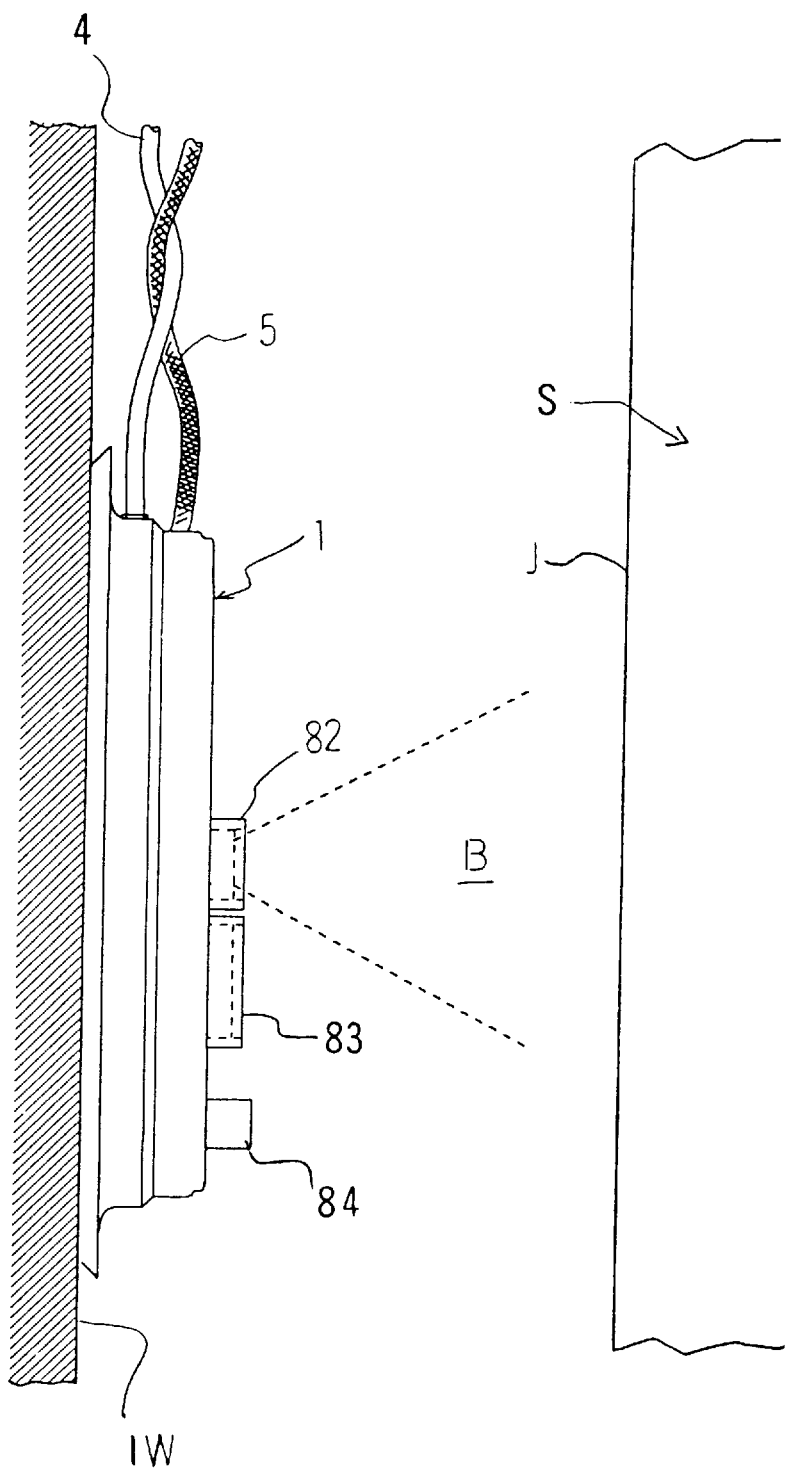
FIG. 20 illustrates a lateral view of the vehicle shown in FIG. 19 with a beam being radiated to an underwater structure.
Figure 21A:
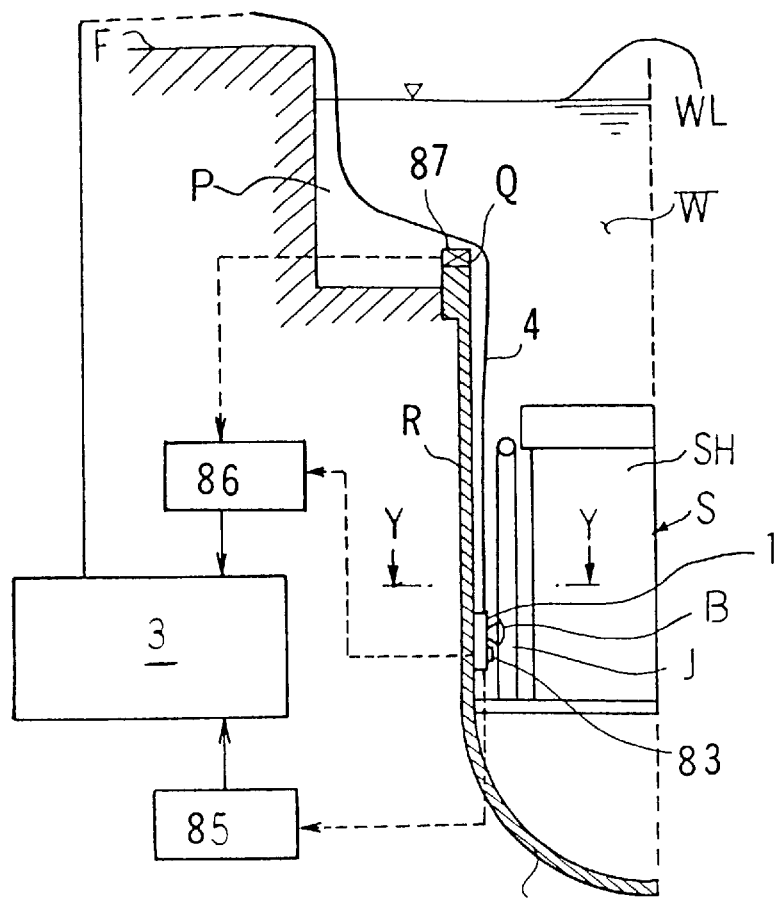
FIG. 21A is an illustration useful to explain a method of positioning the underwater vehicle shown in FIG. 19.
Figure 21B:
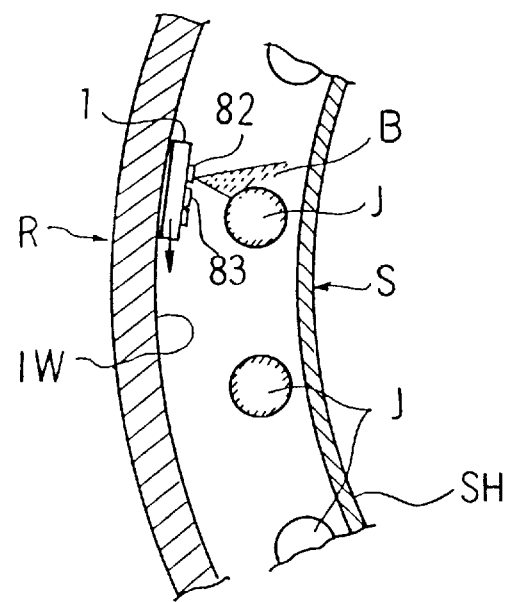
FIG. 21B is a sectional view taken along the line Y—Y of FIG. 21A.

Referring to FIGS. 19 to 21B, one embodiment of a method of positioning the vehicle is illustrated. FIG. 19 is a plan view of the vehicle, FIG. 20 is a lateral view of the vehicle, FIG. 21A shows how the position of the vehicle is determined according to the present invention and FIG. 21B illustrates a sectional view taken along the line Y—Y of FIG. 21A. In FIG. 21A, like FIG. 1, W designates cooling water, R a cylindrical reactor pressure vessel filled with the water W, IW an inner wall of the pressure vessel R. P a fuel pool, S a structure built in the reactor pressure vessel R such as shroud SH and jet pump J, F a floor and WL water level. Positions, shapes and sizes of the shroud Sll and jet pump J are known. The controller 3 is provided for remote controlling the vehicle 1. The cable 5 connects the controller 3 with the vehicle 1.

Referring to FIG. 20, the vehicle 1 has on its back 1c a beam radiator or projector 82 for radiating a beam of light B and a reflection light sensor 83 for detecting a reflected light. The beam projector 82 is closely positioned in front of the reflection light sensor 83. The beam projector 82 radiates the beam B horizontally toward the underwater structure S and the reflection light sensor 83 detects the light reflected from the structure S (or J). Using such beam projector and reflection light sensor 82 and 83, the distance between the vehicle 1 and structure S (or J) is measured. Behind the reflection light sensor 83 on the back Ic of the vehicle 1, provided is a depth measuring device 84 for detecting the depth of the vehicle 1 in the water.

Power and signal lines (not shown) for the beam projector 82, reflection light sensor 83 and depth sounding meter 84 are coupled with the main controller 3 located on the floor F via the control board 16 provided in the vehicle 1.

As illustrated in FIG. 21A, a vertical position determining module 86 for detecting the position of the vehicle 1 in the vertical direction (i.e., height or depth direction of the reactor pressure vessel R) and a horizontal position determining module 85 for detecting the position of the vehicle 1 in the horizontal direction are also coupled to the main controller 3. The beam projector 82 and reflection light sensor 83 are connected to the horizontal position determination module 85, and the depth sounding meter 84 is connected to the vertical position determination module 86. It should be noted that any type of the above-described drive units and suction units are employable.

Referring to FIG. 21A, a reference point Q is determined at an arbitrary position near the water level WL of the reactor pressure vessel R and a depth sounding device 87 is located at the reference point Q for measuring the depth of the reference point Q. Then, the underwater vehicle 1 is loaded into the water W contained in the reactor pressure vessel R from the floor F by a manipulator or the like (not shown) and caused to adhere on the vertical wall IW with its head (or front) being up as depicted in FIG. 20. The underwater vehicle 1 is moved down on the wall IW until it reaches a desired position on the wall IW while maintaining its upright posture. The vehicle 1 is stopped by an operator who watches the vehicle 1 by his/her eyes or monitors the vehicle by an ITV camera or the like. After that, the depth sounding device 87 detects a water pressure at the reference point Q and another depth sounding meter 84 mounted on the vehicle 1 detects a water pressure at the vehicle's position. The data of these water pressures are input to the depth measuring unit 86. The depth measuring unit 86 calculates difference between the two water pressures detected by the depth sounding meters 84 and 87 and operates (or computes) the distance from the reference point Q to the vehicle 1. The distance computed is then input to the main controller 3. The main controller 3 determines the vertical position of the vehicle 1 relative to the reactor pressure vessel R using the distance from the reference point Q to the vehicle 1 obtained from the depth determination unit 86 as well as size, shape and dimensions of the reactor vessel R which are known from the design drawings etc. In sum, in this embodiment, the first depth sounding meter 83 is mounted on the vehicle 1, the second depth sounding meter 87 is provided at the reference point Q of the reactor pressure vessel R, the data obtained from these depth meters are not used directly but their difference is used to determine the depth of the vehicle 1. Therefore, it is possible to accurately determine the depth of the vehicle 1 even if the water pressure around the vehicle 1 fluctuates considerably due to, for example, vibrations, depth variations, quality change etc. of the water W in the reactor vessel R. Experiments have revealed that the depth acquired by this method differs from an actual depth only 0.02%. Accordingly, the vertical position of the vehicle 1 in the reactor pressure vessel R can be determined with very high accuracy.

After determining the vertical position of the vehicle 1 relative to the reactor pressure vessel R, the vehicle 1 is turned 90 degrees on the wall IW so that the vehicle 1 is directed in a horizontal direction as shown in FIG. 21B. Then, the beam of light is irradiated from the beam projector 82 mounted on its back toward the structure S built in the reactor pressure vessel R while the vehicle 1 is moving on the wall IW circumferentially and horizontally. During the horizontal and circumferential movement of the vehicle 1, the reflection light from the underwater structure S is detected by the light sensor 83. A typical example of the structure S built in the reactor pressure vessel R at a position closest to the wall IW of the reactor pressure vessel R is a plurality of cylindrical jet pumps J as illustrated in FIGS. 21A and 21B. In the illustrated embodiment, therefore, the nearest jet pump J is the target structure to be lightened by the light beam B.

Figure 22:
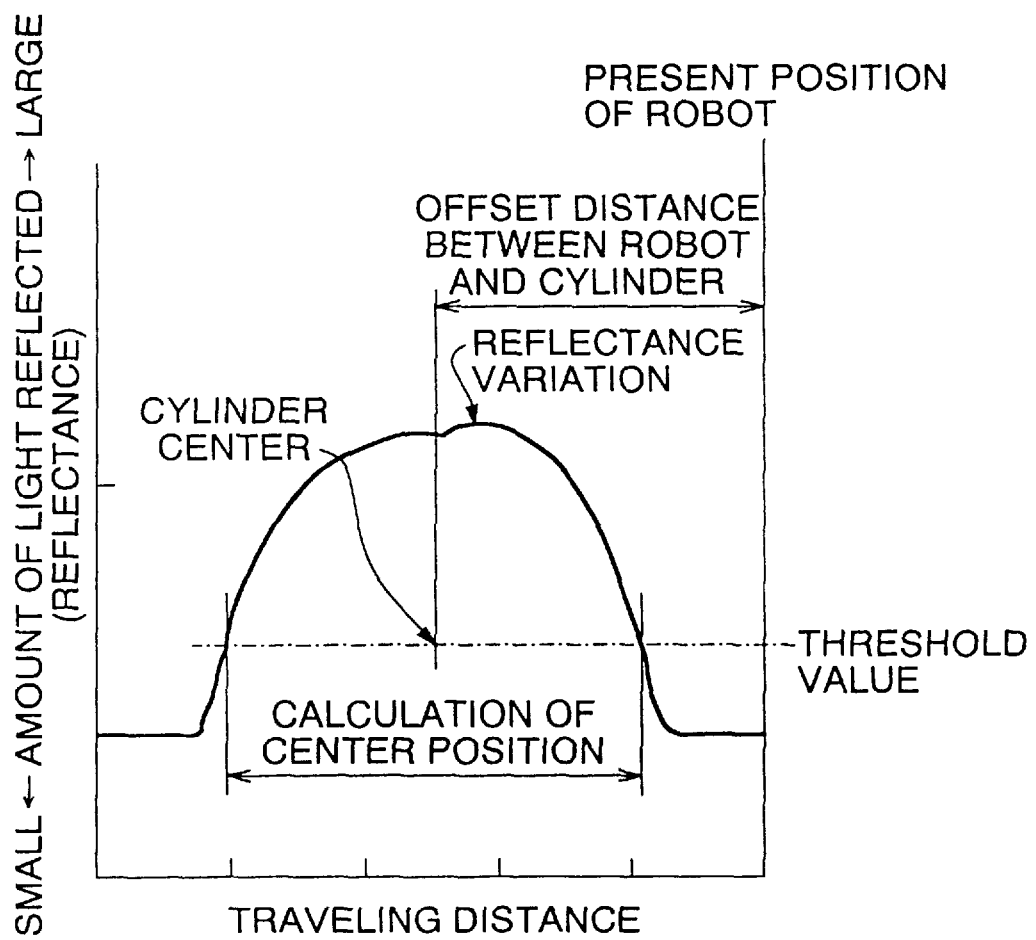
FIG. 22 is a graph depicting relationship between an amount of reflected beam (or reflectance) as detected by a beam detector (i.e., reflection light sensor) and a traveling distance of an underwater vehicle (i.e, robot) on a cylindrical wall in the water.

The amount of reflection of the light beam B from the structure S (or J) varies with the distance from the beam projector 83 to the surface of the jet pump J. The output data of the reflection light sensor 83 is input to the horizontal position determination unit 85. Then, the reflectance variations are computed in the position determination unit 85 and they are input to the main controller 3. Then, the main controller 3 creates a graph as illustrated in FIG. 22 which shows relationship between the output data of the horizontal position determination unit 85 and a traveling locus (i.e., traveling distance in the horizontal and circumferential direction of the cylindrical wall IW) of the vehicle 1. The traveling locus or distance of the vehicle 1 is calculated from data obtained by the planimeter 15 attached to the vehicle 1, a gravity sensor (not shown) etc. Using this graph, the location of the target jet pump J (more particularly the center position of the cylindrical) is computed. The main controller 3 also determines or calculates an offset distance between the cylinder center (i.e., the center of the cylindrical jet pump J) and the present position of the underwater vehicle 1 (i.e., robot). Then, the main controller 3 determines the horizontal position of the vehicle 1 in the reactor pressure vessel R based on a design drawing which indicates the location of the jet pump J.

The position of the vehicle 1 in the reactor pressure vessel R is now determined by the vertical and horizontal positions as obtained in the above described manner. Then, this position is used as a start point and the movement of the vehicle 1 from this start point is measured. It should be noted that the depth sounding meters 84 and 87 are still utilized to determine the vertical position of the vehicle 1 and the planimeter 15 and gravity sensor are still utilized to determine the locus or trace of the vehicle 1. Accordingly, the position of the vehicle 1 relative to the reactor pressure vessel R can be determined accurately.

Figure 23:
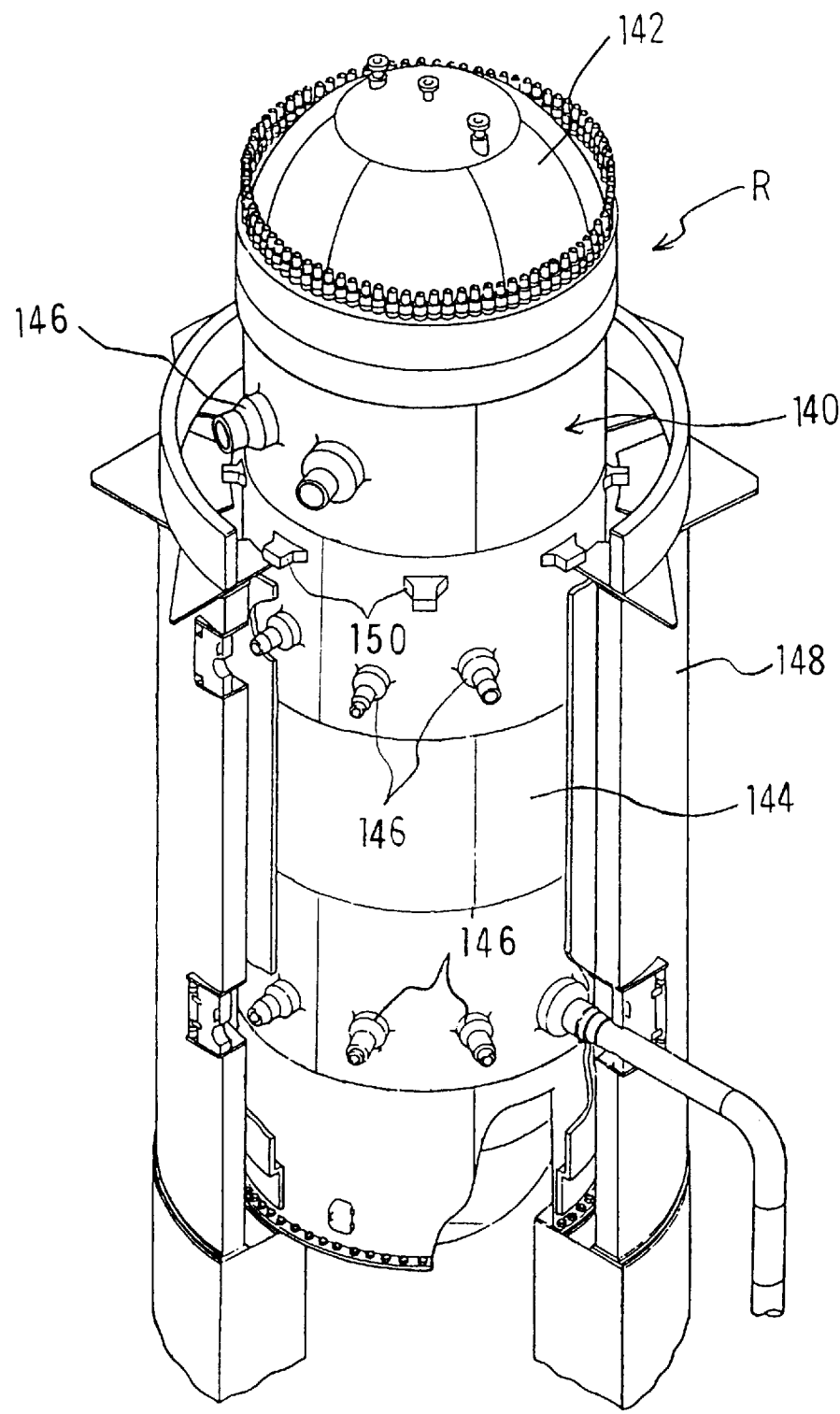
FIG. 23 is a partly sectioned bird's-eye view of a reactor pressure vessel to which a second positioning method for an underwater vehicle according to the present invention is applied.

The above described method of determining the position of the vehicle 1 is a method which is only applicable when the shape, size and location of the structure S (or J) are known. In other words, this method is not useful when there is no structure S (or J) in the reactor pressure vessel R as shown in FIGS. 23 and 24 since the underwater structure is a target or reference structure in determining the horizontal position of the vehicle.

A method described below does not depend on the structure S when it determines the position of the vehicle 1 in the reactor pressure vessel R.

An underwater vehicle 1 shown in FIG. 17 which is provided with the ultrasonic probe 71 is used in this embodiment. The vehicle 1 of the embodiment is equipped with one of the drive units 8 and attaching units 9 described above. FIG. 23 illustrates a perspective view of the reactor pressure vessel R which is partly depicted in cross section and FIG. 24 illustrates a vertical cross section of the reactor pressure vessel R shown in FIG. 23 without a lid 142 of the reactor pressure vessel R and with the vehicle 1 in the water W. This reactor pressure vessel R includes a cylindrical main body 140, a plurality of large and small nozzles 146 provided on an outer surface of the main body 140 for connection with main steam pipes (not shown) and water feed pipes (not shown) and a plurality of brackets 150 projecting outwardly from the main body 140 for attachment of the main body 140 to a surrounding shielding wall 148. The main body 140 is comprised of a number of thick and curved steel plates 144 welded to each other to define a cylindrical body having a bottom.

Figure 24:
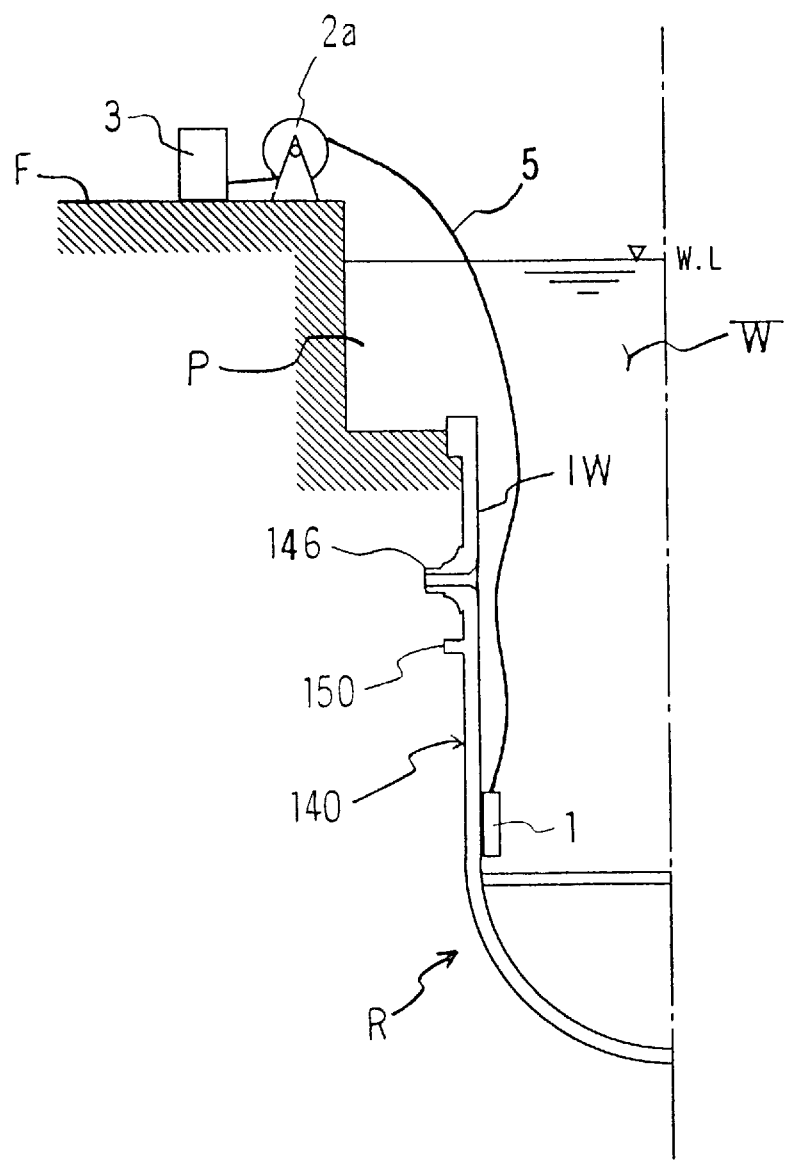
FIG. 24 illustrates a lateral sectional view of the reactor pressure vessel shown in FIG. 23.

Referring to FIGS. 24, the underwater vehicle 1 is caused to move on the inner wall IW of the reactor pressure vessel R in a desired direction and an ultrasonic wave is radiated toward the inner wall IW perpendicularly (to the left in the illustration) from the ultrasonic flaw detector 71 attached to the vehicle 1. Then, the ultrasonic wave is transmitted through (or penetrates) the wall and reflected by an outer surface (or outer wall) of the reactor pressure vessel R. The reflected ultrasonic wave returns to the flaw detector 71. By measuring the reciprocal traveling time (or propagation time) of the ultrasonic wave and analyzing its variations during movement of the vehicle 1 on the wall IW, it is possible to know the shape and thickness of the wall IW as understood from FIG. 25A. Specifically, the propagation time of the ultrasonic wave varies with the distance from the inner wall surface of the reactor pressure vessel R to the outer wall surface so that the thickness of the wall of the reactor pressure vessel R can be determined using the ultrasonic wave propagation time. Further, when the reflection angle at the outer wall surface of the reactor pressure vessel R is not 90 degrees, e.g., when the wave impinges upon an inclined or curved surface or the corner of the reactor pressure vessel R, the reflected wave does not return to the flaw detector 71 completely or at all. By detecting and analyzing such variations of the amount or intensity of the returning wave by a proper processing device, it is also possible to know the outer configuration of the reactor pressure vessel R.

This embodiment takes advantages of the above principle in that it analyzes the variations of the reflection of the ultrasonic wave applied to the wall IW of the reactor pressure vessel R to determine the sizes and positions of the nozzles 146 and brackets 150 provided on the outer surface of the reactor pressure vessel R. In other words, an operator can know the sizes and positions of the components provided on the outer surface of the reactor pressure vessel R using the vehicle 1 positioned inside the reactor pressure vessel R.

Figure 25A:
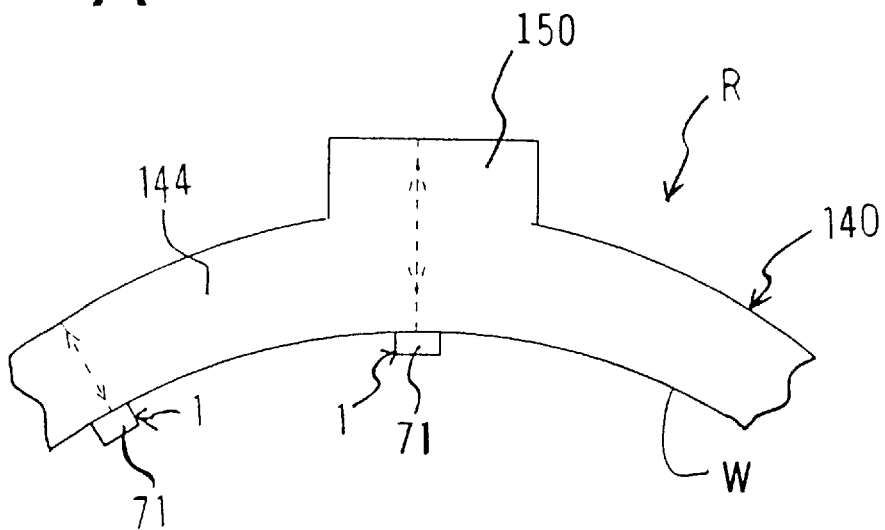
FIG. 25A illustrates a view for the second method of positioning the vehicle according to the present invention.
Figure 25B:
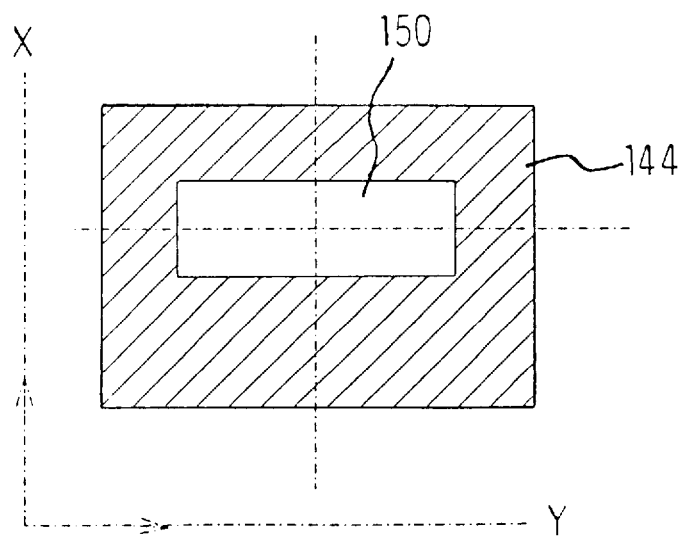
FIG. 25B illustrates a view for the second method of positioning the vehicle according to the present invention.

Referring to FIG. 17, if the vehicle 1 is moved in the X directions (vertical direction) while the associated flaw detector 71 is being reciprocally moved in the Y directions (horizontal direction) and radiating the ultrasonic wave into the wall IW of the reactor pressure vessel R, a longer time is necessary for reciprocal traveling of the ultrasonic wave from the flaw detector 71 when the flaw detector 71 encounters the bracket 150, for example, as shown in FIG. 25A since the wall thickness at that portion is larger. The change of the reflected wave due to propagation time change is analyzed by the processing device to create a graph shown in FIG. 25B for example. This graph provides visual data about the shape and size of the bracket 150. The position of the vehicle 1 relative to the bracket 150 is also determined from this graph. FIG. 25B depicts a graph as acquired by scanning the wall IW of the reactor pressure vessel R in a rectangular area in the vicinity of a particular bracket 150, dividing the ultrasonic wave propagation time by two, applying oblique lines onto that scanned area in which the propagation time is shorter and applying white onto that area in which the propagation time is longer. As understood from FIG. 25B, the shaded area indicates the steel wall 146 of the reactor pressure vessel R having nothing on it or thinner portion of the reactor pressure vessel and the unshaded area indicates the steel wall 146 having the rectangular bracket 150 on it or thicker portion.

Figure 26A:
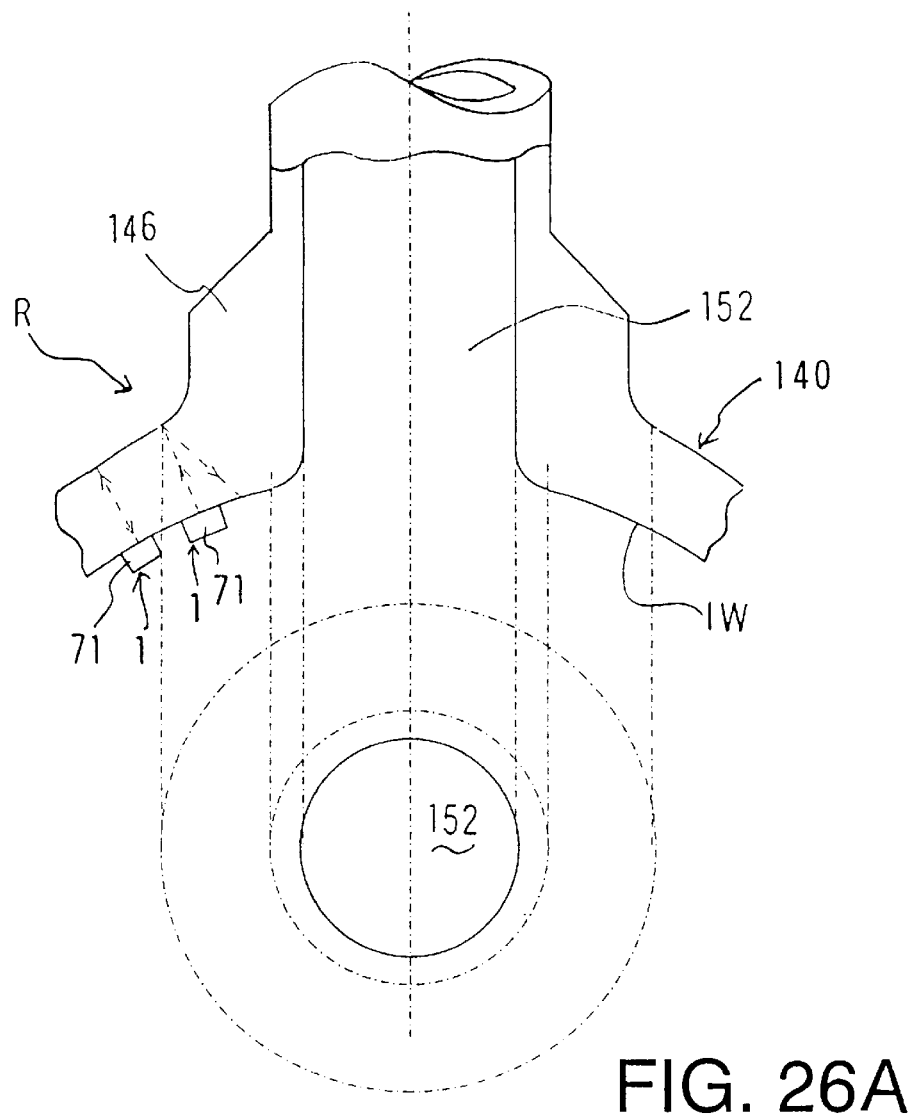
FIG. 26A illustrates a view for the second method of positioning the vehicle according to the present invention.
Figure 26B:
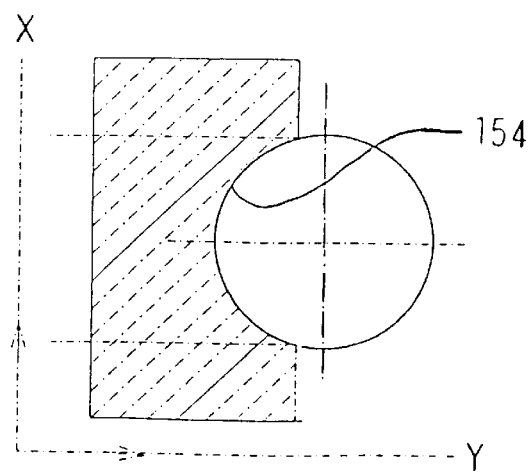
FIG. 26B illustrates a view for the second method of positioning the vehicle according to the present invention.
Figure 27A:
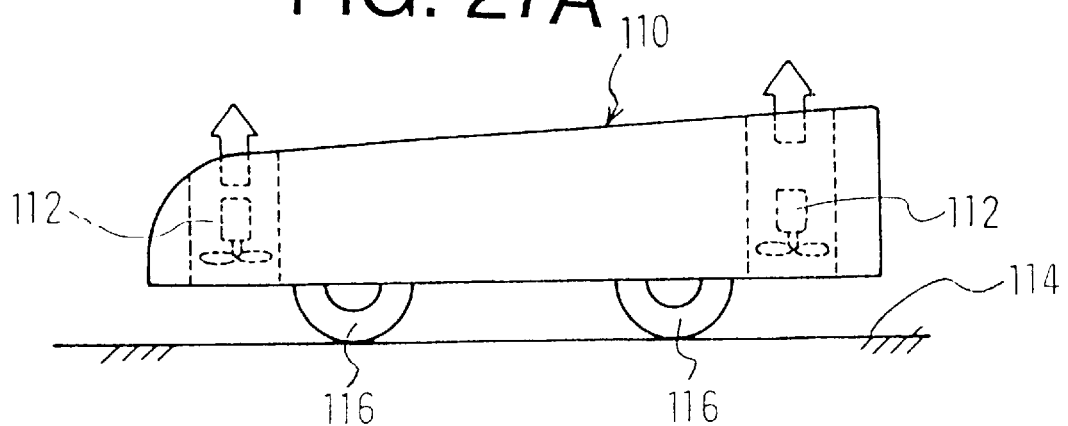
FIG. 27A illustrates a lateral view of a conventional underwater vehicle.
Figure 27B:
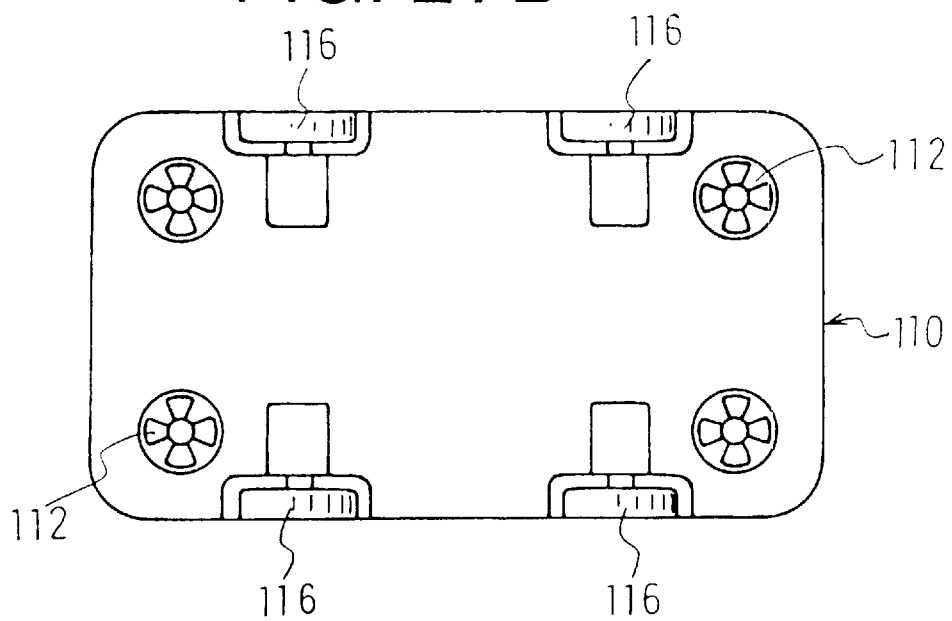
FIG. 27B depicts a bottom view of the vehicle shown in FIG. 27A.

Referring to FIG. 26A, when the ultrasonic probe 71 encounters a particular nozzle 146, the reflected ultrasonic wave received by the ultrasonic probe 71 changes due to the wall thickness change and the reflection angle change. By analyzing these changes, a graphics showing the nozzle 146 is created as illustrated in FIG. 26B. The size and shape of the nozzle 146 as well as the center line position of a nozzle hole 152 can be known from this graph. From the graphed data, it is also possible to determine the location of the vehicle or robot 1 relative to the nozzle 146. FIG. 26B is a view similar to FIG. 25B. This illustration is created by scanning the wall IW of the reactor pressure vessel R in the vicinity of a particular nozzle hole 152 using the ultrasonic probe 71 attached to the vehicle 1. The vehicle 1 is moved in the vertical direction X while the ultrasonic probe 71 is being moved in the horizontal direction Y. The shaded area represents an area in which the reflected ultrasonic wave returns to the ultrasonic probe 71 and the unshaped area represents an area in which no wave returns to the ultrasonic probe 71. The outer periphery K of the circular unshaded area corresponds to the outline of the circular transverse cross section of the nozzle hole 152 as understood from FIGS. 26A and 26B.

The sizes, shapes and locations of all of the components provided on the outer surface of the reactor pressure vessel R such as brackets 150 and nozzles 146 are known from the design drawings. Therefore, it is feasible to determine the present position of the robot 1 relative to the reactor pressure vessel R.

After determining the present position of the robot 1 in this manner, this position is used as a start or reference position. The robot 1 is then moved on the wall IW while its locus is being continuously monitored by the gravity sensor and/or planimeter mounted on the robot 1. Simultaneously, flaw detection is also carried out by the flaw detector 71. Consequently, the highly accurate flaw detection is performed.

As understood from the above description, it is possible to determine the position of the robot 1 precisely and easily even if there is no structure in the reactor pressure vessel R or even if there is a structure S but it is not available for determination of the present position of the robot 1. The flaw detector 71 mounted on the robot 1 can be used for both the position determination and the flaw detection without any modifications. Unlike the conventional apparatuses, therefore, various devices are not necessary for the position determination of the robot 1. Accordingly, the manufacturing cost, weight and dimensions of the robot 1 are considerably reduced and the position determination process is also simplified greatly. It should be noted that a high precision depth sounding meter may be attached to the robot 1 and data obtained by this depth sounding meter may also be used as the analysis data so that it is easily possible to distinguish a plurality of same components arranged on the outer surface of the reactor pressure vessel R in the height direction of the reactor pressure vessel R. It should also be noted that the foregoing has dealt with the reactor pressure vessel as one example of a large vessel filled with the water, but application of the present invention is not limited to the reactor pressure vessel. For instance, the teaching of the invention is applicable to other types of vessel or container such as LNG tanks or spherical gas tanks as long as their shapes and dimensions are known beforehand.

What is claimed is:

1. An underwater vehicle comprising:
   a body having an abdomen, a back, a front portion, a rear portion, a width direction and a first opening in its abdomen;
   a float provided at the front portion of the body so that the body suspends in the water with its front portion being up;
   means for reducing an inner pressure of the body so as to cause the body to suctionally adhere on a wall in the water with its abdomen facing the wall;
   a sealing skirt provided around a periphery of the opening formed in the abdomen of the body so that it contacts the wall in a sealing manner to maintain the body's inner pressure negative as the body adheres on the wall; and
   means provided in the body for moving the body on the wall.

2. The underwater vehicle of claim 1 wherein the pressure reducing means includes a pressure resistive hose which is flexible and communicated with the body at its one end and a pressure reducing pump connected with the other end of the hose for pulling water out of the body.

3. The underwater vehicle of claim 2 wherein the moving means includes first and second drive wheels and a ball caster which are respectively provided in the body, contact the wall and stably support in combination the body on the wall when the body suctionally adheres on the wall, a first drive motor for driving the first drive wheel and a second drive motor for driving the second drive wheel.

4. The underwater vehicle of claim 2 wherein the moving means includes first and second drive wheels which respectively contact the wall when the body suctionally adheres on the wall, first and second driven wheels which respectively contact the wall and stably support the body on the wall in combination with the drive wheels when the body suctionally adheres on the wall, a first endless crawler engaged over the first drive and driven wheels, a second endless crawler engaged over the second drive and driven wheels, a first drive motor for driving the first drive wheel and a second drive motor for driving the second drive wheel.

5. The underwater vehicle of claim 2 wherein the sealing skirt includes a flare ring portion attached to a periphery of the first opening of the body and a sealing ring portion attached to a periphery of the flare ring portion for contact with the wall when the body suctionally adheres on the wall.

6. The underwater vehicle of claim 5 wherein the sealing ring portion has an inclined surface along its periphery such that the inclined surface diagonally extends with respect to the wall when the body suctionally adheres on the wall.

7. The underwater vehicle of claim 5 wherein the sealing ring portion has a plurality of annular ridges in its face which extends along a periphery of the sealing ring portion and contacts the wall when the body suctionally adheres on the wall.

8. The underwater vehicle of claim 5 wherein the sealing ring portion has in its wall-contacting face a plurality of grooves which extend radially so that a certain amount of water can flow out of and into the body through the plurality of grooves.

9. The underwater vehicle of claim 2 further including a planimeter for detecting a traveling distance of the body and a gravity sensor for detecting inclination of the body.

10. The underwater vehicle of claim 2 further including means for cleaning the wall as the body moves on the wall.

11. The underwater vehicle of claim 10 wherein the cleaning means includes a rotary cleaning unit which contacts the wall while it is rotating and a drive motor for driving the rotary cleaning unit.

12. The underwater vehicle of claim 11 wherein the rotary cleaning unit is a rotary brush which includes a rotation shaft extending in a perpendicular direction toward the wall when the body of the vehicle adheres on the wall and a number of hairs attached to an end of the rotation shaft.

13. The underwater vehicle of claim 11 wherein the rotary cleaning unit is a rotary file having a rotation shaft and a grinding member at an end of the rotation shaft.

14. The underwater vehicle of claim 11 wherein the rotary cleaning unit is a rotary brush having a cylindrical body extending in parallel to the wall when the vehicle body adheres on the wall and a number of brush hairs attached to an outer surface of the cylindrical body.

15. The underwater vehicle of claim 2 further including an ultrasonic probe attached to the vehicle for detecting a flaw in the wall.

16. The underwater vehicle of claim 15 wherein the ultrasonic probe includes a linear rail member attached to the rear portion of the body such that the rail member extends in the width direction of the body behind the body, a guide provided on the rail such that it can slide along the rail member, first and second pulleys provided at ends of the rail member, an endless belt engaged over the first and second pulleys and connected with the guide such that the guide moves with the endless belt, a drive device for driving at least one of the pulleys, an arm pivotably attached to the guide with its free end being forced to the wall and a flaw detector mounted on the free end of the arm.

17. The underwater vehicle of claim 16 further including a potentiometer for detecting a position of the flaw detector.

18. The underwater vehicle of claim 2 further including a beam projector mounted on the back of the body for outwardly radiating a beam of light in a direction perpendicular to the wall when the body suctionally adheres on the wall, a reflection light sensor provided in the vicinity of the beam projector for detecting the light projected from the beam projector and returning to the sensor and a water pressure sensor for detecting a water pressure outside the body.

19. The underwater vehicle of claim 1 wherein the pressure reducing means includes a second opening formed in the back of the body and a submerged pump provided near the second opening for discharging water out of the body from the second opening.

20. The underwater vehicle of claim 19 wherein the moving means includes first and second drive wheels and a ball caster which are respectively provided in the body, contact the wall and stably support in combination the body on the wall when the body suctionally adheres on the wall, a first drive motor for driving the first drive wheel and a second drive motor for driving the second drive wheel.

21. The underwater vehicle of claim 19 wherein the moving means includes first and second drive wheels which respectively contact the wall when the body suctionally adheres on the wall, first and second driven wheels which respectively contact the wall and stably support the body on the wall in combination with the drive wheels when the body suctionally adheres on the wall, a first endless crawler engaged over the first drive and driven wheels, a second endless crawler engaged over the second drive and driven wheels, a first drive motor for driving the first drive wheel and a second drive motor for driving the second drive wheel.

22. The underwater vehicle of claim 19 wherein the sealing skirt includes a flare ring portion attached to a periphery of the first opening of the body and a sealing ring portion attached to a periphery of the flare ring portion for contact with the wall when the body suctionally adheres on the wall.

23. The underwater vehicle of claim 22 wherein the sealing ring portion has an inclined surface along its periphery such that the inclined surface diagonally extends with respect to the wall when the body suctionally adheres on the wall.

24. The underwater vehicle of claim 22 wherein the sealing ring portion has a plurality of annular ridges in its face which extends along a periphery of the sealing ring portion and contacts the wall when the body suctionally adheres on the wall.

25. The underwater vehicle of claim 22 wherein the sealing ring portion has in its wall-contacting face a plurality of grooves which extend radially so that a certain amount of water can flow out of and into the body through the plurality of grooves.

26. The underwater vehicle of claim 19 further including a planimeter for detecting a traveling distance of the body and a gravity sensor for detecting inclination of the body.

27. The underwater vehicle of claim 19 further including means for cleaning the wall as the body moves on the wall.

28. The underwater vehicle of claim 27 wherein the cleaning means includes a rotary cleaning unit which contacts the wall while it is rotating and a drive motor for driving the rotary cleaning unit.

29. The underwater vehicle of claim 28 wherein the rotary cleaning unit is a rotary brush which includes a rotation shaft extending in a perpendicular direction toward the wall when the body of the vehicle adheres on the wall and a number of hairs attached to an end of the rotation shaft.

30. The underwater vehicle of claim 28 wherein the rotary cleaning unit is a rotary file having a rotation shaft and a grinding member at an end of the rotation shaft.

31. The underwater vehicle of claim 28 wherein the rotary cleaning unit is a rotary brush having a cylindrical body extending in parallel to the wall when the vehicle body adheres on the wall and a number of brush hairs attached to an outer surface of the cylindrical body.

32. The underwater vehicle of claim 19 further including means provided in the second opening for collecting dusts and wastes gathered by the cleaning means.

33. The underwater vehicle of claim 32 wherein the dust/waste collecting means includes a wire screen located over the back of the body.

34. The underwater vehicle of claim 32 further including a filter made from an unwoven fabric and attached to the wire screen.

35. The underwater vehicle of claim 33 further including a magnetic plate attached to the wire screen for attracting metallic particles.

36. The underwater vehicle of claim 19 further including an ultrasonic probe attached to the vehicle for detecting a flaw in the wall.

37. The underwater vehicle of claim 36 wherein the ultrasonic probe includes a linear rail member attached to the rear portion of the body such that the rail member extends in the width direction of the body behind the body, a guide provided on the rail such that it can slide along the rail member, first and second pulleys provided at ends of the rail member, an endless belt engaged over the first and second pulleys and connected with the guide such that the guide moves with the endless belt, a drive device for driving at least one of the pulleys, an arm pivotably attached to the guide with its free end being forced to the wall and a flaw detector mounted on the free end of the arm.

38. The underwater vehicle of claim 37 further including a potentiometer for detecting a position of the flaw detector.

39. The underwater vehicle of claim 19 further including a beam projector mounted on the back of the body for outwardly radiating a beam of light in a direction perpendicular to the wall when the body suctionally adheres on the wall, a reflection light sensor provided in the vicinity of the beam projector for detecting the light projected from the beam projector and returning to the sensor and a water pressure sensor for detecting a water pressure outside the body.

40. The underwater vehicle of claim 1 wherein the pressure reducing means includes a second opening formed in the back of the body and a thrust fan provided near the second opening for discharging water out of the body from the second opening.

41. The underwater vehicle of claim 19 or 40 further including a check valve provided near the second opening and normally biased to its closed position for preventing the water from flowing into the body from the second opening.

42. The underwater vehicle of claim 40 further including means for detecting a first pressure outside the body and a second pressure inside the body and a switch for activating the thrust fan according to difference between the first and second pressures.

43. The underwater vehicle of claim 40 wherein the moving means includes first and second drive wheels and a ball caster which are respectively provided in the body, contact the wall and stably support in combination the body on the wall when the body suctionally adheres on the wall, a first drive motor for driving the first drive wheel and a second drive motor for driving the second drive wheel.

44. The underwater vehicle of claim 40 wherein the moving means includes first and second drive wheels which respectively contact the wall when the body suctionally adheres on the wall, first and second driven wheels which respectively contact the wall and stably support the body on the wall in combination with the drive wheels when the body suctionally adheres on the wall, a first endless crawler engaged over the first drive and driven wheels, a second endless crawler engaged over the second drive and driven wheels, a first drive motor for driving the first drive wheel and a second drive motor for driving the second drive wheel.

45. The underwater vehicle of claim 40 wherein the sealing skirt includes a flare ring portion attached to a periphery of the first opening of the body and a sealing ring portion attached to a periphery of the flare ring portion for contact with the wall when the body suctionally adheres on the wall.

46. The underwater vehicle of claim 18 wherein the sealing ring portion has an inclined surface along its periphery such that the inclined surface diagonally extends with respect to the wall when the body suctionally adheres on the wall.

47. The underwater vehicle of claim 45 wherein the sealing ring portion has a plurality of annular ridges in its face which extends along a periphery of the sealing ring portion and contacts the wall when the body suctionally adheres on the wall.

48. The underwater vehicle of claim 45 wherein the sealing ring portion has in its wall-contacting face a plurality of grooves which extend radially so that a certain amount of water can flow out of and into the body through the plurality of grooves.

49. The underwater vehicle of claim 40 further including a planimeter for detecting a traveling distance of the body and a gravity sensor for detecting inclination of the body.

50. The underwater vehicle of claim 40 further including means for cleaning the wall as the body moves on the wall.

51. The underwater vehicle of claim 50 wherein the cleaning means includes a rotary cleaning unit which contacts the wall while it is rotating and a drive motor for driving the rotary cleaning unit.

52. The underwater vehicle of claim 51 wherein the rotary cleaning unit is a rotary brush which includes a rotation shaft extending in a perpendicular direction toward the wall when the body of the vehicle adheres on the wall and a number of hairs attached to an end of the rotation shaft.

53. The underwater vehicle of claim 51 wherein the rotary cleaning unit is a rotary file having a rotation shaft and a grinding member at an end of the rotation shaft.

54. The underwater vehicle of claim 51 wherein the rotary cleaning unit is a rotary brush having a cylindrical body extending in parallel to the wall when the vehicle body adheres on the wall and a number of brush hairs attached to an outer surface of the cylindrical body.

55. The underwater vehicle of claim 40 further including means provided in the second opening for collecting dusts and wastes inside the vehicle body.

56. The underwater vehicle of claim 55 wherein the dust/waste collecting means includes a wire screen located over the back of the body.

57. The underwater vehicle of claim 56 further including a filter made from an unwoven fabric and attached to the wire screen.

58. The underwater vehicle of claim 56 further including a magnetic plate attached to the wire screen for attracting metallic particles.

59. The underwater vehicle of claim 40 further including an ultrasonic probe attached to the vehicle for detecting a flaw in the wall.

60. The underwater vehicle of claim 59 wherein the ultrasonic probe includes a linear rail member attached to the rear portion of the body such that the rail member extends in the width direction of the body behind the body, a guide provided on the rail such that it can slide along the rail member, first and second pulleys provided at ends of the rail member, an endless belt engaged over the first and second pulleys and connected with the guide such that the guide moves with the endless belt, a drive device for driving at least one of the pulleys, an arm pivotably attached to the guide with its free end being forced to the wall and a flaw detector mounted on the free end of the arm.

61. The underwater vehicle of claim 60 further including a potentiometer for detecting a position of the flaw detector.

62. The underwater vehicle of claim 40 further including a beam projector mounted on the back of the body for outwardly radiating a beam of light in a direction perpendicular to the wall when the body suctionally adheres on the wall, a reflection light sensor provided in the vicinity of the beam projector for detecting the light projected from the beam projector and returning to the sensor and a water pressure sensor for detecting a water pressure outside the body.

63. The underwater vehicle of claim 1 wherein the moving means includes first and second drive wheels and a ball caster which are respectively provided in the body, contact the wall and stably support in combination the body on the wall when the body suctionally adheres on the wall, a first drive motor for driving the first drive wheel and a second drive motor for driving the second drive wheel.

64. The underwater vehicle of claim 1 wherein the moving means includes first and second drive wheels which respectively contact the wall when the body suctionally adheres on the wall, first and second driven wheels which respectively contact the wall and stably support the body on the wall in combination with the drive wheels when the body suctionally adheres on the wall, a first endless crawler engaged over the first drive and driven wheels, a second endless crawler engaged over the second drive and driven wheels, a first drive motor for driving the first drive wheel and a second drive motor for driving the second drive wheel.

65. The underwater vehicle of claim 1 wherein the sealing skirt includes a flare ring portion attached to a periphery of the first opening of the body and a sealing ring portion attached to a periphery of the flare ring portion for contact with the wall when the body suctionally adheres on the wall.

66. The underwater vehicle of claim 65 wherein the sealing ring portion has an inclined surface along its periphery such that the inclined surface diagonally extends with respect to the wall when the body suctionally adheres on the wall.

67. The underwater vehicle of claim 65 wherein the sealing ring portion has a plurality of annular ridges which extends along a periphery of the sealing ring portion and contacts the wall when the body suctionally adheres on the wall.

68. The underwater vehicle of claim 65 wherein the sealing ring portion has in its wall-contacting face a plurality of grooves which extend radially so that a certain amount of water can flow out of and into the body through the plurality of grooves.

69. The underwater vehicle of claim 1 further including a planimeter for detecting a traveling distance of the body and a gravity sensor for detecting inclination of the body.

70. The underwater vehicle of claim 1 further including means for cleaning the wall as the body moves on the wall.

71. The underwater vehicle of claim 70 wherein the cleaning means includes a rotary cleaning unit which contacts the wall while it is rotating and a drive motor for driving the rotary cleaning unit.

72. The underwater vehicle of claim 71 wherein the rotary cleaning unit is a rotary brush which includes a rotation shaft extending in a perpendicular direction toward the wall when the body of the vehicle adheres on the wall and a number of hairs attached to an end of the rotation shaft.

73. The underwater vehicle of claim 71 wherein the rotary cleaning unit is a rotary file having a rotation shaft and a grinding member at an end of the rotation shaft.

74. The underwater vehicle of claim 71 wherein the rotary cleaning unit is a rotary brush having a cylindrical body extending in parallel to the wall when the vehicle body adheres on the wall and a number of brush hairs attached to an outer surface of the cylindrical body.

75. The underwater vehicle of claim 1 further including an ultrasonic probe attached to the vehicle for detecting a flaw in the wall.

76. The underwater vehicle of claim 75 wherein the ultrasonic probe includes a linear rail member attached to the rear portion of the body such that the rail member extends in the width direction of the body behind the body, a guide provided on the rail such that it can slide along the rail member, first and second pulleys provided at ends of the rail member, an endless belt engaged over the first and second pulleys and connected with the guide such that the guide moves with the endless belt, a drive device for driving at least one of the pulleys, an arm pivotably attached to the guide with its free end being forced to the wall and a flaw detector mounted on the free end of the arm.

77. The underwater vehicle of claim 76 further including a potentiometer for detecting a position of the flaw detector.

78. The underwater vehicle of claim 1 further including a beam projector mounted on the back of the body for outwardly radiating a beam of light in a direction perpendicular to the wall when the body suctionally adheres on the wall, a reflection light sensor provided in the vicinity of the beam projector for detecting the light projected from the beam projector and returning to the sensor and a water pressure sensor for detecting a water pressure outside the body.

79. A method of determining a position of an underwater vehicle movable on a vertical wall of a vessel, the vessel being filled with a water, comprising the steps of:

A) determining a reference point in the vessel;

B) providing a first depth sounding meter on the reference point and providing a second depth sounding meter, a beam projector and a reflection light sensor on the vehicle respectively:

C) determining a depth of the reference point using the first depth sounding meter and that of the vehicle using the second depth sounding meter;

D) calculating a difference between the depth of the reference point and that of the vehicle;

E) determining a vertical position of the vehicle relative to the vessel based on the depth difference obtained in step D);

F) projecting a beam of light from the beam projector to a structure built in the vessel;

G) detecting an amount of beam of light reflected by the structure using the reflection light sensor;

H) determining a position and a shape of the structure;

I) determining a horizontal position of the vehicle using the amount of the reflected light detected in step G) and the position and shape of the structure obtained in step H); and J) determining the position of the vehicle from the vertical and horizontal positions obtained in steps E) and I).

80. The method of claim 79, wherein the step H) is carried out using a design drawing of the structure.

81. A method of determining a position of an underwater vehicle movable on a vertical wall of a vessel, the vessel being filled with a water and having various kinds of structures on its outer surface, comprising the steps of:

A) determining sizes, shapes and locations of the structures on the outer surface of the vessel;

B) providing an ultrasonic wave device on the vehicle for radiating an ultrasonic wave to the wall and receiving a returning wave;

C) causing the ultrasonic wave device to radiate the ultrasonic wave to the wall and to receive the returning wave while moving the vehicle on the wall;

D) analyzing the returning wave continuously to determine variations of the returning wave;

E) determining the kinds of the structures based on the variations of the returning wave;

F) determining the position of the vehicle relative to the structures based on the determined kinds of the structure acquired in step E) and the determined and sizes, shapes and locations of the structures acquired in step A); and G) determining the position of the vehicle relative to the vessel from the position of the vehicle relative to the structures obtained in step F) and the determined and sizes, shapes and locations of the structures obtained in step A).

82. The method of claim 81, wherein the step A) is carried out using design drawings of the vessel and structures.

83. The method of claim 81, wherein the vessel is a reactor vessel of a reactor pressure vessel and the ultrasonic wave device is an ultrasonic probe.

* * * * *